(12) United States Patent
Kitaura et al.

(10) Patent No.: US 9,840,199 B2
(45) Date of Patent: Dec. 12, 2017

(54) VEHICLE IMAGE PROCESSING APPARATUS AND VEHICLE IMAGE PROCESSING METHOD

(71) Applicant: FUJITSU LIMITED, Kawasaki-shi, Kanagawa (JP)

(72) Inventors: Asako Kitaura, Kawasaki (JP); Seiya Shimizu, Kawasaki (JP); Hiroshi Yamada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/188,460

(22) Filed: Jun. 21, 2016

(65) Prior Publication Data

US 2016/0297364 A1    Oct. 13, 2016

Related U.S. Application Data

(63) Continuation of application No. 14/703,112, filed on May 4, 2015, now Pat. No. 9,403,483, which is a
(Continued)

(30) Foreign Application Priority Data

May 29, 2008  (JP) ................................. 2008-140931

(51) Int. Cl.
*H04N 7/18*   (2006.01)
*B60R 1/00*   (2006.01)
(Continued)

(52) U.S. Cl.
CPC .............. *B60R 1/00* (2013.01); *B60K 35/00* (2013.01); *G06T 3/0056* (2013.01);
(Continued)

(58) Field of Classification Search
CPC ..... B60R 1/00; B60R 2300/105; B60R 11/04; B60R 2300/802; B60R 2300/602;
(Continued)

(56) References Cited

U.S. PATENT DOCUMENTS 7,027,616 B2   4/2006   Ishii
7,034,861 B2   4/2006   Okada et al.
(Continued)

FOREIGN PATENT DOCUMENTS

EP     1179958 A1    2/2002
JP     2002-83285    3/2002
(Continued)

OTHER PUBLICATIONS

Notice of Allowance dated Aug. 25, 2016 in U.S. Appl. No. 12/907,314.
(Continued)

*Primary Examiner* — Mohammed Rahaman
*Assistant Examiner* — Richard Carter
(74) *Attorney, Agent, or Firm* — Staas & Halsey LLP

(57) ABSTRACT

A vehicle image processing apparatus includes a group of cameras, a drawing unit that converts a captured image into an image viewed along a line of sight running from a predetermined position in a predetermined direction, a viewing-line-of-sight changing unit that detects whether a first line of sight is switched to a second line of sight, and a viewing-line-of-sight generation/updating unit that acquires parameters concerning the first and second lines of sight after detecting the switching and generates a parameter which is gradually changed from the parameter of the first line of sight to the parameter of the second line of sight. Moreover, the drawing unit generates, on the basis of the gradually changed parameter, an image which is gradually
(Continued)

changed from an image viewed along the first line of sight to an image viewed along the second line of sight.

6 Claims, 19 Drawing Sheets

Related U.S. Application Data continuation of application No. 12/907,314, filed on Oct. 19, 2010, now Pat. No. 9,475,430, which is a continuation of application No. PCT/JP2009/055003, filed on Mar. 16, 2009.

(51) Int. Cl.
*G06T 5/00* (2006.01)
*G06T 3/40* (2006.01)
*B60K 35/00* (2006.01)
*G06T 3/00* (2006.01)

(52) U.S. Cl.
CPC ............ *G06T 3/4038* (2013.01); *G06T 5/006* (2013.01); *H04N 7/18* (2013.01); *H04N 7/181* (2013.01); *B60K 2350/106* (2013.01); *B60R 2300/105* (2013.01); *B60R 2300/602* (2013.01); *G06T 2207/30252* (2013.01)

(58) Field of Classification Search
CPC .......... H04N 7/181; H04N 7/18; B60K 35/00; B60K 2350/106; G06T 3/0056; G06T 3/4038; G06T 5/006; G06T 2207/30252
USPC .............................................. 348/148, 222.1
See application file for complete search history.

(56) References Cited

U.S. PATENT DOCUMENTS

| | | | |
|---|---|---|---|
| 7,161,616 B1* | 1/2007 | Okamoto | B60R 1/00 348/148 |
| 7,307,655 B1* | 12/2007 | Okamoto | G06K 9/00791 348/222.1 |
| 2002/0018047 A1 | 2/2002 | Okada et al. | |
| 2005/0171684 A1 | 8/2005 | Turner | |
| 2006/0192660 A1 | 8/2006 | Watanabe et al. | |
| 2011/0032357 A1* | 2/2011 | Kitaura | B60R 1/00 348/148 |

FOREIGN PATENT DOCUMENTS

| | | |
|---|---|---|
| JP | 3286306 | 3/2002 |
| JP | 3300334 | 4/2002 |
| JP | 2006-171849 | 6/2006 |
| JP | 2006-279511 | 10/2006 |
| JP | 2007-183877 | 7/2007 |
| JP | 2007-210458 | 8/2007 |

OTHER PUBLICATIONS

Form PCT/ISA/210, mailed May 29, 2008, in corresponding International Application PCT/JP2009/055003 (3 pages).
Form PCT/ISA/220, mailed Jun. 9, 2009, in corresponding International Application PCT/JP2009/055003 (4 pages).
Form PCT/ISA/210, mailed Jun. 9, 2009, in corresponding International Application PCT/JP2009/055003 (3 pages).
International Preliminary Report on Patentability, dated Jan. 11, 2011, in corresponding International Application No. PCT/JP2009/055003 (5 pages).
Japanese Notice of Reasons for Rejection dated Nov. 13, 2012 in corresponding Japanese Patent Application No. 2010-514404.
Extended European Search Report dated Jul. 19, 2013 in corresponding European Application No. 09754502.4.
European Office Action dated Mar. 5, 2014 in corresponding European Application No. 09754502.4.
U.S. Office Action dated Nov. 6, 2012 in related U.S. Appl. No. 12/907,314.
U.S. Office Action dated Mar. 28, 2013 in related U.S. Appl. No. 12/907,314.
U.S. Office Action dated Sep. 12, 2013 in related U.S. Appl. No. 12/907,314.
U.S. Office Action dated Nov. Feb. 4, 2014 in related U.S. Appl. No. 12/907,314.
U.S. Office Action dated Mar. 4, 2015 in related U.S. Appl. No. 12/907,314.
Office Action dated Nov. 13, 2015 in related U.S. Appl. No. 12/907,314.
Office Action dated Apr. 28, 2016 in U.S. Appl. No. 12/907,314.
Notice of Allowance dated Mar. 23, 2016 in related U.S. Appl. No. 14/703,112.
U.S. Appl. No. 12/907,314, filed Oct. 19, 2010, Asako Kitaura et al., Fujitsu Limited.
U.S. Appl. No. 14/703,112, filed May 4, 2015, Asako Kitaura et al., Fujitsu Limited.
Office Action issued by the European Patent Office dated Dec. 15, 2016 in corresponding European patent application No. 09 754 502.4.

* cited by examiner

FIG. 6
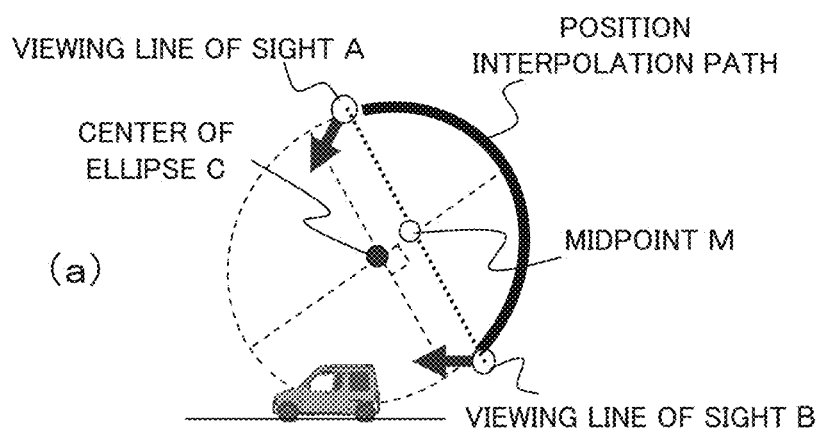
(a)
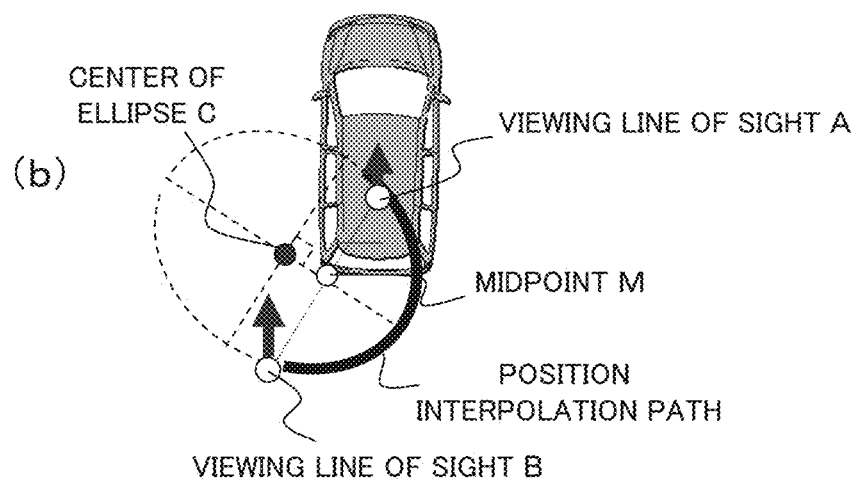
(b)

FIG. 11

PROJECTION MAP A FOR CAMERA A

| POSITION OF PIXEL IN PROJECTION IMAGE | POSITION OF PIXEL IN CAPTURED IMAGE | WEIGHTING FACTOR |
|---|---|---|
| (X1, Y1) | (A1x, A1y) | 1.0 |
| (X2, Y2) | (A2x, A2y) | 0.5 |
| ... | ... | |

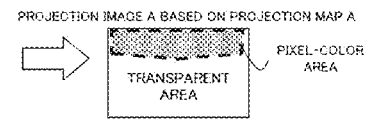

PROJECTION IMAGE A BASED ON PROJECTION MAP A — TRANSPARENT AREA, PIXEL-COLOR AREA

PROJECTION MAP B FOR CAMERA B

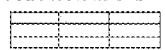

PROJECTION IMAGE B BASED ON PROJECTION MAP B

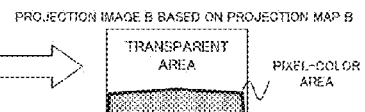

TRANSPARENT AREA, PIXEL-COLOR AREA

PROJECTION MAP C FOR CAMERA C

| POSITION OF PIXEL IN PROJECTION IMAGE | POSITION OF PIXEL IN CAPTURED IMAGE | WEIGHTING FACTOR |
|---|---|---|
| (X2, Y2) | (C1x, C1y) | 1.0 |
| ... | ... | |

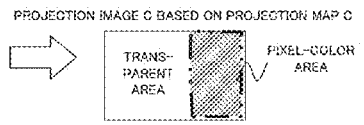

PROJECTION IMAGE C BASED ON PROJECTION MAP C — TRANSPARENT AREA, PIXEL-COLOR AREA

PROJECTION MAP D FOR CAMERA D

| POSITION OF PIXEL IN PROJECTION IMAGE | POSITION OF PIXEL IN CAPTURED IMAGE | WEIGHTING FACTOR |
|---|---|---|
| (X1, Y1) | (D1x, D1y) | 1.0 |
| ... | ... | |

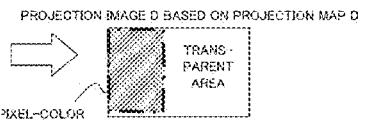

PROJECTION IMAGE D BASED ON PROJECTION MAP D — TRANSPARENT AREA, PIXEL-COLOR AREA

COMBINED PROJECTION IMAGE

FIG.16
(a) 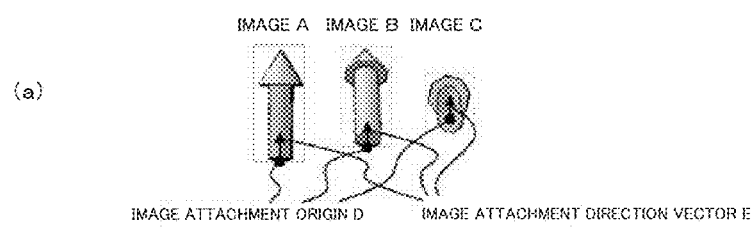
(b)
| ANGLE α° | USED IMAGE |
|---|---|
| 60~120, 240~300 | IMAGE A |
| 30~60, 120~150, 210~240, 300~330 | IMAGE B |
| 0~30, 150~210, 330~360 | IMAGE C |
(c) 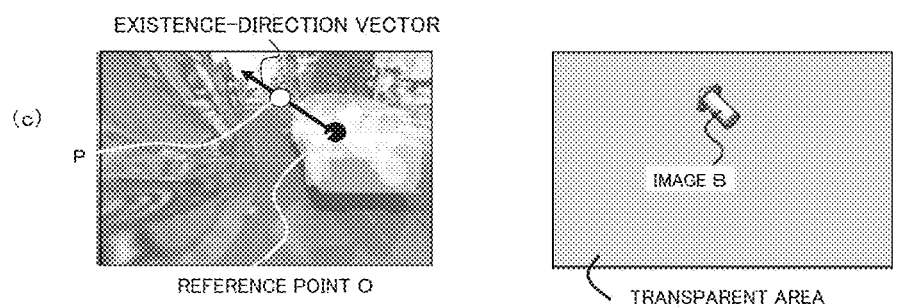

FIG. 19

| ITEM | CONDITION | USAGE CONTENTS | REMARKS |
|---|---|---|---|
| DIFFERENCE OF LINE-OF-SIGHT PARAMETER FROM TO-BE-VIEWED/DISPLAYED LINE OF SIGHT | ANGLE BETWEEN TO-BE-VIEWED/DISPLAYED LINE OF SIGHT AND LINE-OF-SIGHT DIRECTION OF PSEUDO DRIVER'S LINE OF SIGHT IS GREATER THAN OR EQUAL TO 30 DEGREES | PERFORM CHANGED IMAGE USING PSEUDO DRIVER'S LINE OF SIGHT AS FIRST VIRTUAL LINE OF SIGHT | PSEUDO DRIVER'S LINE OF SIGHT IS USED BECAUSE IT IS DETERMINED THAT VIEWING LINE OF SIGHT IS SIGNIFICANTLY DIFFERENT FROM ACTUAL LINE OF SIGHT OF DRIVER USING PSEUDO DRIVER'S LINE OF SIGHT |
| DIFFERENCE OF LINE-OF-SIGHT PARAMETER FROM TO-BE-VIEWED/DISPLAYED LINE OF SIGHT | ANGLE BETWEEN TO-BE-VIEWED/DISPLAYED LINE OF SIGHT AND LINE-OF-SIGHT DIRECTION OF PSEUDO DRIVER'S LINE OF SIGHT IS LESS THAN 30 DEGREES | USE CHANGED IMAGE FROM CURRENT VIEWING LINE OF SIGHT WITHOUT USING CHANGED IMAGE THAT USES PSEUDO DRIVER'S LINE OF SIGHT | PSEUDO DRIVER'S LINE OF SIGHT IS NOT USED BECAUSE IT IS DETERMINED THAT VIEWING LINE OF SIGHT IS NOT SO MUCH DIFFERENT FROM ACTUAL LINE OF SIGHT OF DRIVER AND IT IS EASY TO GRASP CONTENTS OF IMAGE |
| DRIVER'S VEHICLE AND SURROUNDING ENVIRONMENT | DRIVER'S VEHICLE=ABRUPT STEERING, HIGH-SPEED RUNNING, SURROUNDING ENVIRONMENT=ON EXPRESSWAY, DISCOVERY OF OBSTACLE RAPIDLY APPROACHING, OR THE LIKE | NOT USE CHANGED IMAGE THAT USES PSEUDO DRIVER'S LINE OF SIGHT | CHANGED IMAGE IS NOT USED WHEN LINE OF SIGHT IS URGENTLY CHANGED AND TARGET LINE-OF-SIGHT IMAGE IS PROMPTLY DISPLAYED. |
| STATUS OF UPDATING VIEWING LINE OF SIGHT | IT IS ALREADY DETERMINED TO STOP UPDATING VIEWING LINE OF SIGHT | NOT USE CHANGED IMAGE THAT USES PSEUDO DRIVER'S LINE OF SIGHT | CHANGED IMAGE IS NOT USED WHEN LINE OF SIGHT IS URGENTLY CHANGED AND TARGET LINE-OF-SIGHT IMAGE IS PROMPTLY DISPLAYED. |

VEHICLE IMAGE PROCESSING APPARATUS AND VEHICLE IMAGE PROCESSING METHOD

CROSS-REFERENCE TO RELATED APPLICATIONS

This application is a continuation of U.S. application Ser. No. 14/703,112 filed May 4, 2015, which is a continuation of U.S. application Ser. No. 12/907,314 filed Oct. 19, 2010, which is based upon and claims the benefit of priority of the prior continuation application, filed under 35 U.S.C. §111 (a), of PCT Application No. PCT/JP 2009/055003, filed Mar. 16, 2009, and claims priority to Japanese Patent Application No. 2008-140931, filed May 29, 2008, the disclosures of which are herein incorporated in their entirety by reference.

FIELD

The present invention relates to a vehicle image processing apparatus used to visually check an environment around a driver's vehicle when the car is running.

BACKGROUND

In order for a driver of a vehicle to visually check an environment around the driver's vehicle, there is a system that allows the driver to objectively and intuitively grasp the situation around the driver's vehicle by combining and converting a plurality of vehicle-mounted camera images into an image (overhead image) that views with a virtual line of sight that is a line of sight extending, for example, from the sky above the driver's vehicle to the driver's vehicle and displaying the image. An extended version disclosed is, for example, an image generation device that: turns a captured vehicle-mounted camera image into a three-dimensional space model without change; maps color information of the image onto the three-dimensional space model; converts the three-dimensional space model into an image seen from an arbitrary visual point; and displays the image.

If a three-dimensional shape (the shape of a cylinder, bowl or quasi-cylinder) made up of curved and flat surfaces is used as a model on which a camera image is projected just as the image generation device does, the advantage is that it is possible to view not only an overhead image around a vehicle but also all surrounding images including the sky at the same time.

What is also disclosed for such an image generation device is a technique of helping a driver check the safety in driving a vehicle by changing the images being displayed for the driver depending on the running state of the vehicle, i.e. the running speed, the steering angle of the wheel and the state of the results of detection by an object detection sensor.

As a result, it is possible to change images to be displayed that are supplied from a vehicle-mounted camera at a viewing position determined by a scene such as the operation of a vehicle.

The followings are disclosed as conventional techniques.
[Patent Document 1] Japanese Patent No. 3,286,306
[Patent Document 2] Japanese Patent No. 3,300,334

SUMMARY

A vehicle image processing apparatus comprising: a distortion correction unit that acquires a captured image which is an image that has captured an area around a vehicle with the use of at least one camera; a drawing unit that uses at least one predetermined projection shape to convert the captured image into an image viewed along a virtual line of sight that is a line of sight running from a predetermined position in a predetermined direction; a viewing-line-of-sight changing unit that detects whether a first virtual line of sight which is a predetermined virtual line of sight is switched to a second virtual line of sight which is a different virtual line of sight from the first virtual line of sight; and a viewing-line-of-sight generation/updating unit that acquires at least one type of parameter value concerning the virtual lines of sight each for the first and second virtual lines of sight after detecting that the first virtual line of sight is switched to the second virtual line of sight, and generating a parameter value that is gradually changed from the parameter value of the first virtual line of sight to the parameter value of the second virtual line of sight; wherein the drawing unit generates, on the basis of the gradually changed parameter value, at least one changed image which is an image that is gradually changed from a first image which is an image viewed along the first virtual line of sight to a second image which is an image viewed along the second virtual line of sight, wherein the viewing-line-of-sight changing unit detects that the first virtual line of sight is switched to the second virtual line of sight if the switching is the switching of a virtual line of sight which is registered in advance or if the difference between the unchanged and changed virtual lines of sight is greater than or equal to a specified value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of an interpolation method (ellipse's arc) of a parameter of a viewing line of sight according to the embodiment of the present invention;

FIG. 11 is a diagram for explaining a projection method that uses a projection map of each camera according to the embodiment of the present invention (combining of images);

FIG. 16 is a diagram illustrating a related object image and the disposition of the related object image according to the embodiment of the present invention;

FIG. 19 is a diagram illustrating a list where usage determinations of a pseudo driver's line of sight are listed.

DESCRIPTION OF EMBODIMENT

According to the above conventional techniques, when a viewing line of sight (a virtual line of sight) is changed, an image viewed by a driver abruptly changes. Therefore, it is difficult for the driver to promptly grasp the situation around a vehicle that the image depicts after the line of sight is changed.

The above problem will be further described with reference to FIG. 17. In FIG. 17(a), as an example of changing the viewing line of sight, an overhead view seen from the sky above a driver's vehicle and a cross-sectional view seen from the left side of the driver's vehicle illustrate a position (predetermined position) of the viewing ling of sight and a viewing direction (predetermined direction). FIG. 17(b) is an example of images for each viewing line of sight illustrated in FIG. 17(a). For example, an image with a viewing line of sight A could suddenly change to an image with a viewing line of sight D. In this manner, when an image suddenly changes to another with a large difference in the field of view as illustrated in FIG. 17(b) where the viewing positions and the viewing directions are different, it is difficult for a driver to promptly determine where an attention area of the previous image is positioned in the succeeding image after the changing.

To solve the above problems, the embodiment is to provide a vehicle image processing device capable of changing a viewing line of sight smoothly.

Figure 1:
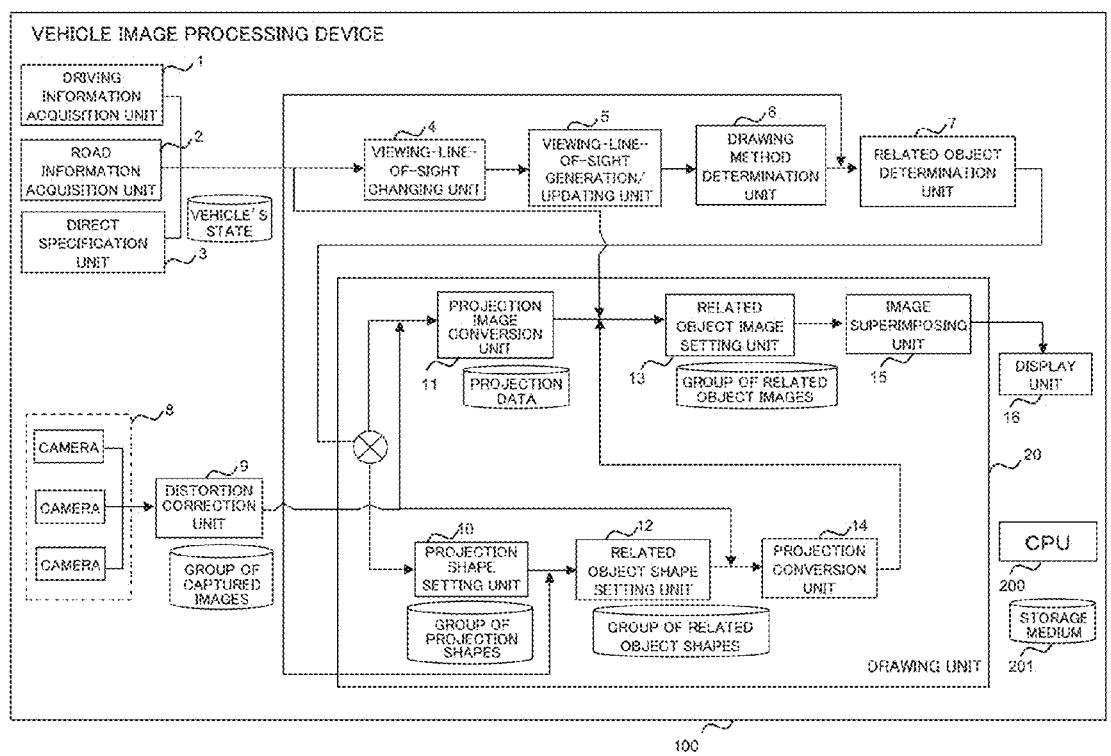
FIG. 1 is a block diagram illustrating an example of the configuration of a vehicle image processing device according to an embodiment of the present invention.

FIG. 1 illustrates an example of the configuration of a vehicle image processing device (a vehicle image processing apparatus) according to an embodiment of the present invention. A vehicle image processing device 100 is equipped with a driving information acquisition unit 1, a road information acquisition unit 2, a direct specification unit 3, a viewing-line-of-sight changing unit 4, a viewing-line-of-sight generation/updating unit 5, a drawing method determination unit 6, a related object determination unit 7, a group of cameras 8 (The group of cameras 8 is made up of a plurality of vehicle-mounted cameras), a distortion correction unit 9, a drawing unit 20 and a display unit 16. The drawing unit 20 is equipped with a projection shape setting unit 10, a projection image conversion unit 11, a related object shape setting unit 12, a related object image setting unit 13, a projection conversion unit 14, and an image superimposing unit 15.

According to the present embodiment, volatile hardware resources, such as a CPU 200, memory and hard disk drive, a nonvolatile hardware resource, which is a storage medium 201, and software resources stored in the storage medium 201 work closely with each other to realize each of the above units.

Incidentally, according to the present embodiment, an example of vehicle-mounted cameras mounted on a driver's vehicle that act as the group of cameras 8 will be described for simplicity of explanation. However, the group of cameras may include cameras installed on any places other than the driver's vehicle, such as infrastructure cameras installed on roads or other vehicle cameras; through a communication means such as wireless communication, captured images supplied from the above cameras may be acquired as input images for use. Even when any cameras other than those mounted on the driver's vehicle are used, the operation is described in the same way as the vehicle-mounted cameras mounted on the driver's vehicle. Only when particular attention needs to be paid because the operations and processes are different, the difference will be described if preferable.

The following describes the operation of the vehicle image processing device 100 based on each of the above units.

Figure 2:
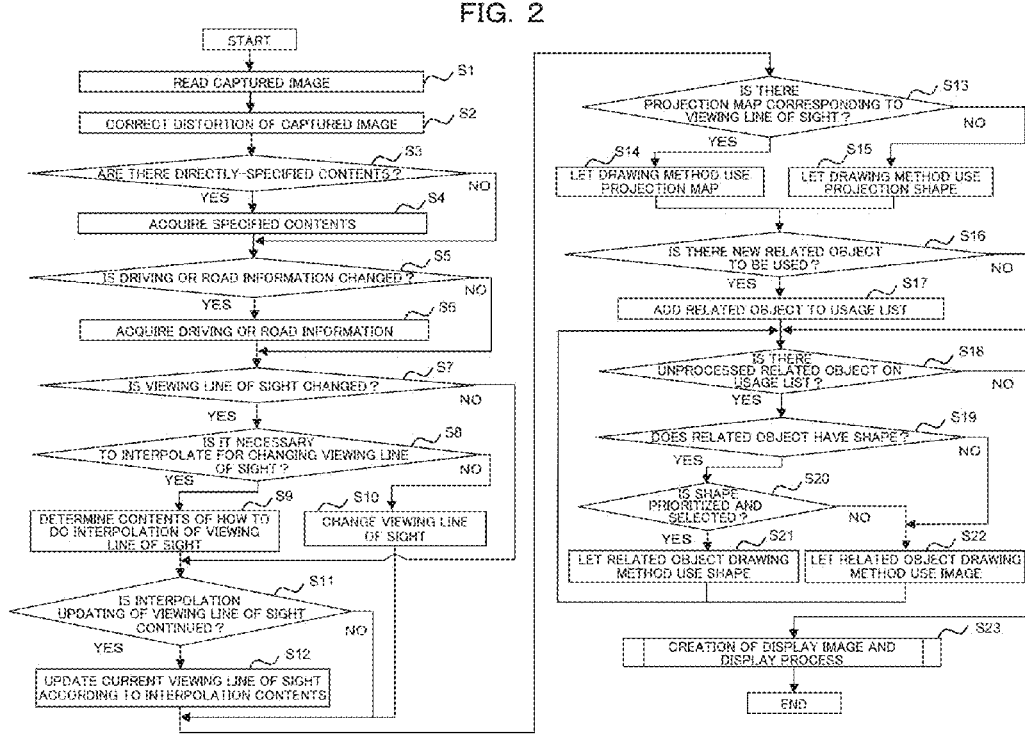
FIG. 2 is a flowchart illustrating an example of a process of the vehicle image processing device according to the embodiment of the present invention.
Figure 3:
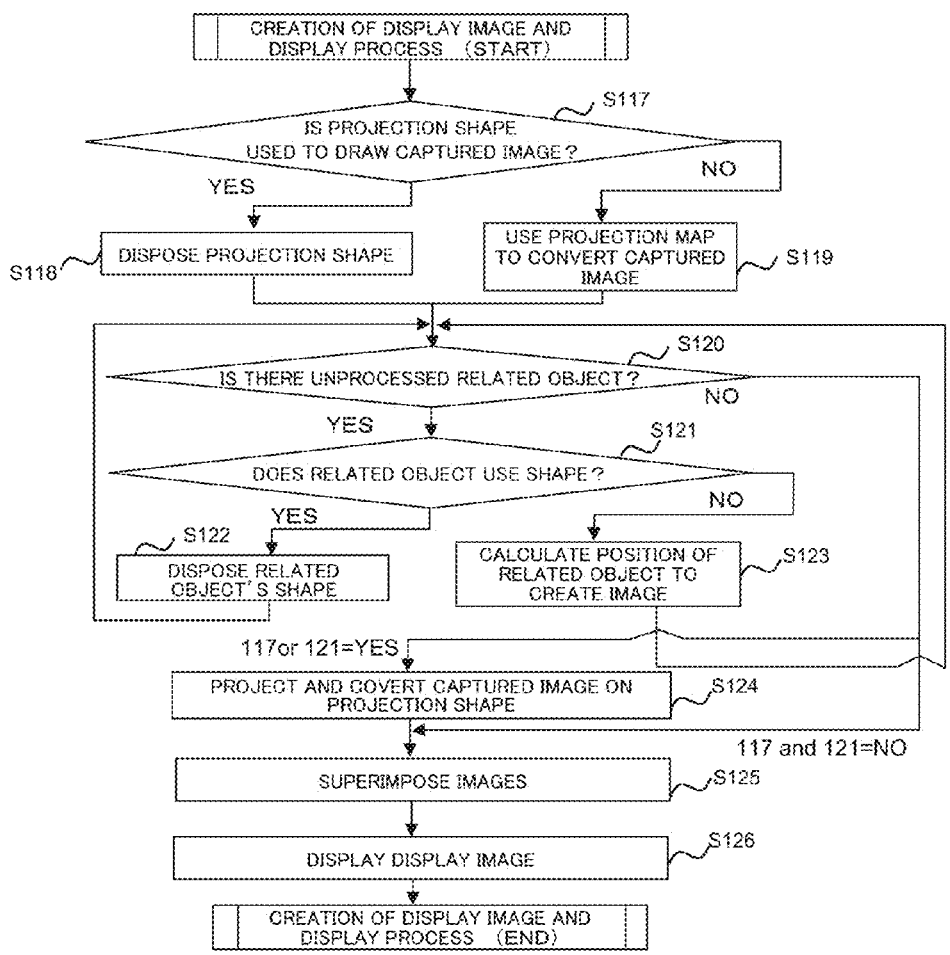
FIG. 3 is a flowchart (a drawing process and a display process) illustrating an example of a process of the vehicle image processing device according to the embodiment of the present invention.

FIGS. 2 and 3 are flowcharts illustrating an example of the operation of the vehicle image processing device 100.

First, the distortion correction unit 9 reads a captured image from each of the corresponding cameras of the group of cameras 8 (Step S1) and corrects the distortion of the captured image to obtain a corrected image (Step S2). The distortion is attributable to lenses of the cameras and the like and is an already-known distortion. The distortion correction unit 9 therefore uses an already-known method to correct. Incidentally, the correction of the image's distortion is performed at the beginning for simplicity of explanation. However, the correction of the image's distortion may be performed when the projection image conversion unit 11 converts the image as described below or when the projection conversion unit 14 projects the image. Or alternatively, the correction of the image's distortion may be omitted.

When the correction of the distortion is performed by the projection image conversion unit 11, it is possible to carry out the correction with a simpler process if the correction of the distortion is regarded as adjusting pixel positions inside the captured images and if, when a projection map is created that illustrates the relationships between pixel positions inside the captured image that is to be referred to and pixel positions inside the converted image, the adjustment of pixel positions for correcting distortion is included in advance. Similarly, when the correction of the distortion is performed by the projection conversion unit 14, it is easy to carry out the correction if the adjustment of pixel positions for correcting distortion is included in the relationships between pixel positions inside the captured image, which are used in the projection conversion unit 14 to acquire the color of the pixel of each point of a projection shape, and the coordinates of characteristic points of a projection shape.

Hereinafter, a captured image is considered to be a distortion-corrected captured image when preferable.

Here, suppose that when a captured image of a camera mounted anywhere other than the driver's vehicle is used, a determination is made as to whether there is a camera used for the reading of the captured image in the surrounding area before the captured image is read, and camera parameters, such as the position and direction of the camera, and the captured image are obtained through a wireless means or the like at any time. Incidentally, the camera parameters may not be acquired directly: a list of camera parameters corresponding to a camera ID may be acquired in advance, and only the camera ID may be acquired and converted to enable the camera parameters to be acquired when preferable. In this case, the correction of the distortion may be performed in the driver's vehicle after the captured image is read out. However, it is not efficient to acquire parameters for correcting the distortion from a camera mounted on another vehicle or infrastructure cameras installed on the roadside through wireless communication every time. Therefore, it is desirable that the distortion-corrected captured image be read out to omit the correction in the driver's vehicle or that the correction be carried out by converting and acquiring the correction parameters from the above list with the use of the ID.

Then, the direct specification unit 3 makes a determination as to whether there are the contents (about customization of the vehicle image processing device 100 by a user) directly specified by a user, such as a driver, who uses the vehicle image processing device 100 (Step S3). If there are the directly-specified contents (Step S3, YES), the specified contents are acquired (Step S4). A more detailed description of the specified contents will be given along with a description of the contents of how a viewing line of sight is changed. Incidentally, it is not preferable for the processes of steps S3 and S4 to be performed here in the flowchart. If there is no specific problem in consistency, the vehicle image processing device 100 may perform the process as a priority interrupt process after detecting the specifying at any time. Incidentally, the direct specification unit 3 is primarily aimed at allowing a user to correct or customize the contents when preferable that are automatically determined inside the vehicle image processing device 100. Therefore, the direct specification unit 3 may be omitted.

Then, the driving information acquisition unit 1 makes a determination as to whether the driving information has changed, while the road information acquisition unit 2 makes a determination as to whether the road information has changed (Step S5). If there is a change (Step S5, YES), both the driving information for the driver's vehicle and the road information are acquired (Step S6). Here, the driving information contains: the speed and travelling direction of the driver's vehicle, which can be acquired form a vehicle speed sensor, gyroscope, gear or the like; and the driving operation (information about the driving of the vehicle) concerning a forward movement, left or right turn and backward movement, which can be acquired from the operation or amount of operation of a wheel, gear, direction indicator or the like. The road information is the information that can be acquired from a wireless communication device that carries out car-navigation or communication between vehicles on the road. The road information contains the shapes of roads, the types of roads, the types of urban districts, the state of congestion, road information, and map information of stores and the like (information about the road around the vehicle) and is acquired from a map database, GPS or the like along with the position of the driver's vehicle. Incidentally, the shape of a road and an obstacle may be directly acquired by the driver's vehicle with the use of an external sensor such as a millimeter wave sensor or laser sensor. Moreover, each piece of the information acquired by the driving information acquisition unit 1 and the road information acquisition unit 2, particularly the information acquired by the road information acquisition unit 2, is mainly referred to in the process of identifying a scene to change the viewing line of sight as described below or in the process of making a determination as to whether a related object is used, an arrangement method or the like. Therefore, the driving information acquisition unit 1 and the road information acquisition unit 2 may be omitted.

Then, the viewing-line-of-sight changing unit 4 makes a determination as to (or detects) whether the current viewing line of sight (a first virtual line of sight) has changed to another viewing line of sight (a second virtual line of sight) on the basis of the acquired driving information, road information, or contents of a user's instruction (Step S7). If there is the change (Step S7, YES), the viewing-line-of-sight changing unit 4 proceeds to a process of the viewing-line-of-sight generation/updating unit 5 (Step S8). If there is no change (Step S7, NO), the viewing-line-of-sight changing unit 4 proceeds to an update determination process of the viewing line of sight (To step S11). Incidentally, in a broad sense, the changing of the viewing line of sight can be divided into two: the change resulting from the updating of line-of-sight parameters associated with the calculation of line-of-sight interpolation by the viewing-line-of-sight generation/updating unit 5 as described below; and the change resulting from the changing of the lines of sight in response to mainly the changing of scenes. Hereinafter, for the purpose of convenience, the former is referred to as the updating of the viewing line of sight, and the latter as the changing of the viewing line of sight. In the latter case where the viewing line of sight is changed, images generated from the unchanged and changed viewing lines of sight are a first image and a second image, respectively.

The changing of the viewing line of sight is the changing of one viewing line of sight to another in response to each usage scene that is set in advance or the changing of a viewing line of sight to an arbitrary one that a user directly specifies. A determination rule and the contents of changing may be used to make a determination as to whether to perform an already-known changing process.

With reference to the above FIG. 17, an example of changing a viewing line of sight depending on scenes will be described. As described above, FIG. 17(*a*) is a schematic diagram illustrating the positional relationship between the viewing line of sight and the driver's vehicle. FIG. 17(*b*) illustrates a converted image when actually viewed along the viewing line of sight illustrated in FIG. 17(*a*). According to the present embodiment, the viewing line of sight is basically set relative to the driver's vehicle for simplicity of explanation. Suppose that the viewing line of sight moves in conjunction with the movement of the driver's vehicle unless otherwise stated.

Figure 17:
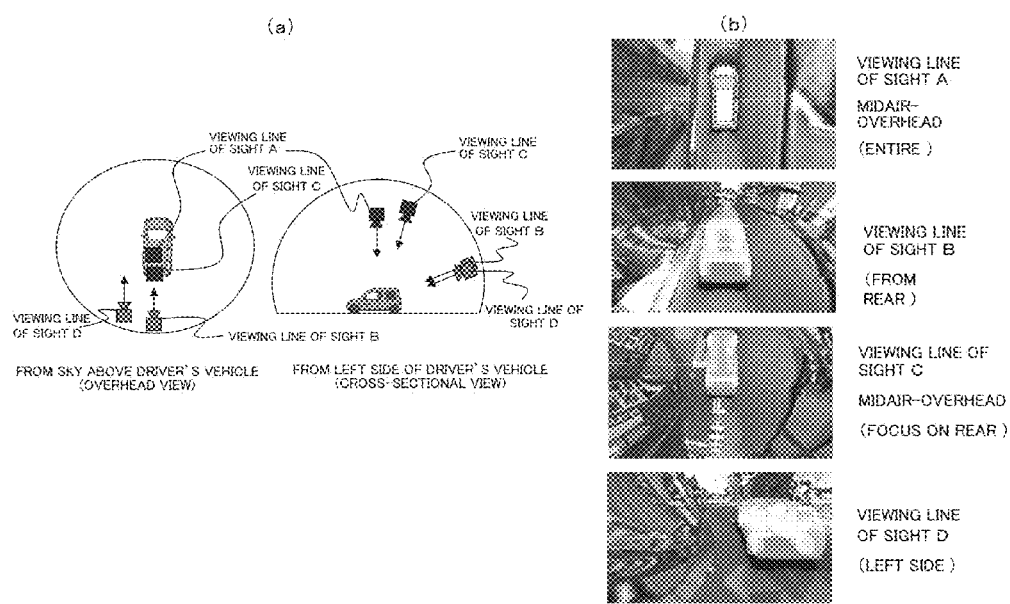
FIG. 17 is a schematic diagram illustrating the position of a viewing line of sight and a viewing direction, as well as a diagram illustrating an example of an image in each viewing line of sight.

For example, for the viewing lines of sight, the following relationships are set in advance: the viewing line of sight A of FIG. 17 that is linked to the driver's vehicle moving forward; the viewing line of sight B that is linked to the driver's vehicle making a right turn; the viewing line of sight D that is linked to the driver's vehicle snaking through a narrow streat; the viewing line of sight C that is linked to the driver's vehicle moving backward in a parking lot or the like. For the scenes and viewing lines of sight that are preset in the above manner, the viewing-line-of-sight changing unit 4 makes a determination as to whether the current driving information, road information or the contents of a user's instruction matches the preset scenes as well as whether it is preferable to change the viewing line of sight. For example, the viewing-line-of-sight changing unit 4 detects that the driver's vehicle moving forward is to make a right turn on the basis of the direction indicator and determines that the current viewing line of sight A for the scene of forward movement is replaced by the viewing line of sight B for a right turn.

Incidentally, the example illustrated in FIG. 17 is an example in which the viewing lines of sight that are set and linked in advance to the scenes are used without change. However, fine adjustments may be made to the viewing lines of sight that are linked to the actual, precise situations of each scene before the viewing lines of sight are used. For example, the following process is considered available: It is decided only to change the direction of the viewing line of sight and the zoom (focal distance) in order to enable an enlarged image of a detected obstacle to be viewed; particular parameters, such as the direction of the viewing line of sight and visual point positions, are adjusted in accordance with the automatically detected position of the obstacle, direction and the like; and a viewing line of sight is replaced by the above viewing line of sight. Incidentally, the example of determining whether the changing of the viewing line of sight is preferable is one example; it is possible to determine to change the viewing line of sight on the basis of other scenes and conditions. For example, as the changing of the viewing line of sight resulting from the detection of a high-priority obstacle as a user's instruction or safe driving information, an enlarged image of the obstacle may be displayed in the field of view or alternatively, the viewing line of sight may change to the one seen from the sky above the driver's vehicle to focus on the positional relationship with the obstacle.

There may be a determination rule that the viewing-line-of-sight changing unit 4 changes the viewing line of sight when the degree of difference between the unchanged and changed virtual lines of sight is greater than or equal to a specified value (for example, when the visual point position and the viewing direction are greater than or equal to a specified distance and angle).

When it is determined that during the process of updating a give viewing line of sight the viewing line of sight is changed to a new one, the vehicle image processing device 100 stops the ongoing updating of the viewing line of sight and starts changing to a new viewing line of sight. In this case, the first image of the unchanged image in the process of changing to a new viewing line of sight does not have a viewing line of sight corresponding to some scene; the first image is a changed image in the preceding process of interpolation updating that is generated from the viewing line of sight for the determination of changing that is a viewing line of sight generated by the interpolation of line-of-sight parameters described below.

In general, it is preferable that the viewing line of sight most suitable for the current scene be used to display. Therefore, the process of interpolation updating is stopped. However, the process may go on without being stopped. In this case, the process is the same as when it is determined that the viewing line of sight is not changed (Step S7, NO).

Incidentally, for the purpose of convenience, the process of interpolation updating is stopped in the above description. However, fine corrections may be made to the contents of interpolation calculation so that the changing to a newly specified viewing line of sight is included, and the updating of the viewing line of sight may continue. In this case, making fine corrections to the contents of interpolation calculation is regarded as determining the new contents of interpolation calculation, and the subsequent processes (after YES of step S7) are performed.

By the way, when it is difficult to figure out from where a new viewing line of sight is seen, it may be impossible to promptly figure out in which direction the line of sight is seeing even if a changed image from the current viewing line of sight is used. To avoid the above, a specified viewing line of sight, for example a line of sight that is close to that of the naked eye of a driver (referred to as a pseudo driver's line of sight, hereinafter), may be always regarded as a first virtual line of sight, and a changed image whose viewing line of sight is always varying may be created from the above line of sight. Therefore, it is possible to view the changed image whose line of sight is changed in a pseudo manner from the current line of sight, which is substantially equal to that of the naked eye of a driver, to the viewing line of sight suitable for a scene. Thus, it is possible to figure out what and from which direction the final viewing line of sight is seeing in a more concrete way.

Figure 18:
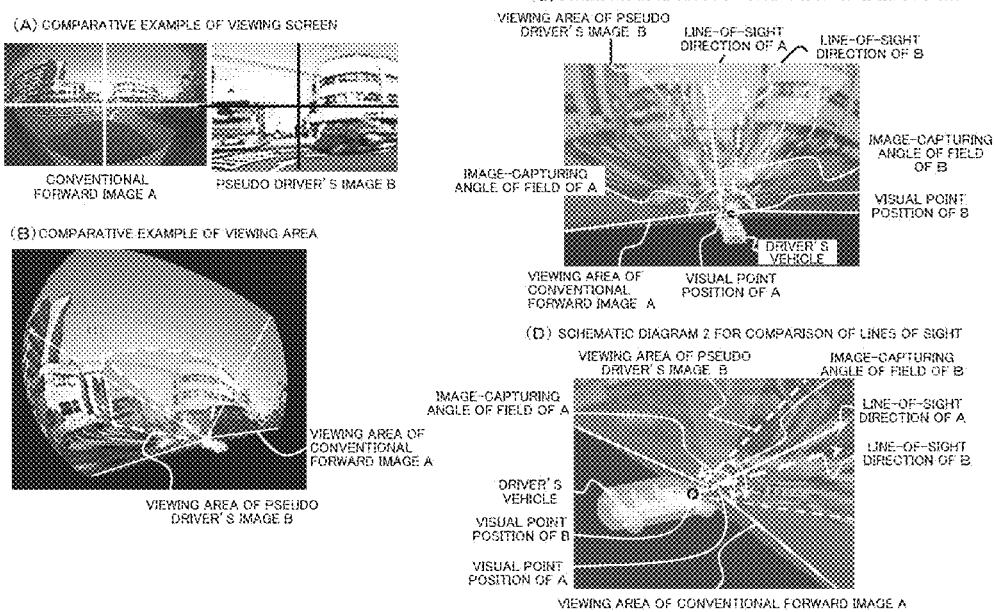
FIG. 18 is a schematic diagram illustrating an example of each image and an example of a line of sight concerning each image in order to explain the difference between a conventional forward image and pseudo driver's image.

FIG. 18 is an explanatory diagram illustrating an example of the pseudo driver's line of sight as well as a difference between the pseudo driver's line of sight and the forward viewing line of sight and forward image used in a conventional technique. FIG. 18(A) illustrates an example of a conventional forward image (forward image A) as well as an example of a pseudo driver's image (pseudo driver's image B) used in the present embodiment. FIGS. 18 (B), 18(C) and 18(D) schematically illustrate an example of a viewing area that can be viewed with the use of line-of-sight parameters, such as the visual point position of the line of sight concerning each of the images, the angle of field and the line-of-sight direction, and the lines of sight.

The conventional forward image is substantially the same as a vehicle-mounted image that is generated by taking a picture in a forward direction that is actually mounted on a recent vehicle. FIG. 18(A) illustrates a forward captured image just as a forward image. For the forward captured image, in order to take a wide-range picture without a blind spot, a wide angle lens of about 180 degrees is used for taking the picture. The picture turns out to be a distorted spherical image as a whole, like the conventional forward image A of FIG. 18(A). Practically, in order to make the image easier to watch, instead of using the forward captured image without change, an image from which the spherical distortion has been removed is used as a forward image in many cases. However, only the distortion of the subject in the image is changed; there is no large change in the line-of-sight parameters and image-capturing area, i.e. in a spatial domain that can be viewed. Therefore, for simplicity of explanation, the forward captured image is illustrated here without change.

As illustrated in FIG. 18(A), the line-of-sight parameters and viewing area of the pseudo driver's image B are significantly different from the forward image A. As described above, the main purpose of the forward image A is to help a driver in driving. Accordingly, a picture is generally taken and displayed with a wide viewing angle of field in both the vertical and horizontal directions so as to contain a blind spot that the driver may not see at the present time, such as a nearby bottom portion of the driver's vehicle; the forward image A and a forward line of sight are a line of sight that is based on such image-capturing parameters. For example, in the bottom portion of the forward image A of FIG. 18(A), the nearby bottom portion of the driver's vehicle is displayed. Meanwhile, the pseudo driver's image B is aimed at reproducing a scene that the driver is now seeing with the naked eye. Therefore, it is not preferable to cover a blind spot; given a field of view at the time of close observation, the angle of field may be a viewing angle of about 50 to 60 degrees, which is substantially the same as that of a typical image-capturing camera. Accordingly, the nearby bottom portion of the driver's vehicle is not displayed in the pseudo driver's image B of FIG. 18(A). However, the pseudo driver's image B is an easy-to-see image having a larger image area that the driver is actually viewing, with the surrounding situation as a whole squeezed more than the forward image A. FIG. 18(B) schematically illustrates a viewing pyramid depicting the viewing line of sight and viewing area that generate two images of FIG. 18(A) as a typical four-sided pyramid (View volume; the base is spherical) with a visual point positioned at the vertex. In the diagram, the viewing pyramid of the pseudo driver's image B is entirely inside the viewing pyramid of the forward image A. However, the viewing pyramid of the pseudo driver's image B may not be entirely enveloped in the viewing pyramid of the forward image A. In this case, for a projecting portion of the viewing area, an image of a camera other than a forward image-capturing camera may be used.

Unlike the forward line of sight of the forward image A, as illustrated in FIGS. 18(C) and 18(D), the position of a pseudo driver's line of sight that is the line of sight of the pseudo driver's image B and a line-of-sight direction vector are not preferably on the central axis of the driver's vehicle and in the traveling direction of the driver's vehicle, respectively. For the forward line of sight of A, a visual point is typically positioned at the center of the driver's vehicle that is a representative point of the driver's vehicle, i.e. close to the forward tip portion on the central axis of the driver's vehicle, with the line-of-sight vector in the direction of the central axis or direction straight ahead, which is the traveling direction of the driver's vehicle. Meanwhile, the center of the pseudo driver's line of sight of B is positioned not at the central axis of the driver's vehicle but at where the driver actually sits in the vehicle. That is, the center is positioned to the left or right from the central axis of the driver's vehicle depending on where the wheel is attached. The position of the naked eye is determined by detecting an amount of operation at a time when the lengthwise position of the driver's seat, the angle of the backrest and the position of the headrest are adjusted. As illustrated in FIG. 18(A), The line-of-sight vector is set in the direction in which the driver is likely to pay the most attention to the center of the facing-and-sneaking-through lane when for example waiting to make a right turn (Incidentally, whether the driver's vehicle is waiting to make a right turn is for example determined by the current speed of the driver's vehicle and whether the direction indicator is operated). It is not preferable for the line-of-sight vector to be in the same direction in which the driver's vehicle travels. When such a pseudo driver's line of sight is used, as illustrated in FIG. 18(A), the positional relationship of each subject relative to the center of the image indicated by "+" in the forward image A is different from that in the pseudo driver's image B.

In that manner, compared with a conventional forward image, the process of determining the pseudo driver's line of sight that more closely represents that of the driver's naked eye and creating the changed image in which the pseudo driver's line of sight serves as a virtual line of sight is effective when the line of sight along which the driver is watching is significantly different from a new line of sight to which the line of sight is to be switched.

Incidentally, the pseudo driver's line of sight is not preferably limited to one. An arbitrary number of pseudo driver's lines of sight may be prepared with varying line-of-sight parameters, including the visual point position that varies according to the sitting height of the driver, the viewing angle that varies according to the age of the driver, and the close observation direction, or line-of-sight direction, that is different from the traveling direction of the driver's vehicle depending on whether a right or left turn is made; the pseudo driver's line of sight may be switched to another when preferable in accordance with a driver's instruction, the surrounding driving environment, the driving state of the driver's vehicle, driver's information and the like. In addition, the above values may be calculated for use so as to more precisely reflect the current state each time. Or alternatively, prepared values may be corrected for use. For example, by detecting the sitting height of the driver, the position of the face and the like with a dedicated camera in the vehicle or various sensors, the pseudo driver's line of sight may be more precisely customized for use.

The pseudo driver's lines of sight may be used not only when a changed image to an arbitrary viewing line of sight as a first virtual line of sight is created but also when the current viewing line of sight is temporarily changed to the pseudo driver's line of sight in order to figure out in which direction an arbitrary viewing line of sight is seeing; and can be used for either the first or second virtual line of sight before or after the interpolation. When an arbitrary viewing line of sight is used for the first or second virtual line of sight, the line-of-sight parameters of the pseudo driver's line of sight may be used during the process of line-of-sight interpolation described below so as to go through the pseudo driver's line of sight in the middle of the changed image that uses the above.

Whether the pseudo driver's line of sight is used or not may be arbitrarily determined. For example, the determination may be made when preferable on the basis of the magnitude of a difference between the line-of-sight parameter of the pseudo driver's line of sight, or the naked eye of the driver, and that of the current viewing line of sight or to-be-displayed viewing line of sight or on the basis of how urgent it is to change the viewing line of sight, which is estimated from the driver's vehicle and the surrounding environment or the state of stopping the updating of the viewing line of sight; and the pseudo driver's line of sight may be used. FIG. 19 illustrates an example of the usage determination.

FIG. 19 is a list where examples of the usage determination of the pseudo driver's line of sight are listed and the conditions for using the pseudo driver's line of sight are listed as one example. When each item agrees with the contents described in a condition, the pseudo driver's line of sight is used according to the usage contents. Incidentally, what is illustrated in FIG. 19 is one example. The usage determination may be made with another arbitrary condition. The pseudo driver's line of sight may be used in a different manner from what are described in the table.

Returning to the explanation of the flowchart of FIG. 2, the viewing-line-of-sight generation/updating unit 5 then makes a determination as to whether to perform the interpolation of the viewing line of sight from the contents of how the viewing line of sight is changed (Step S8). When the interpolation is performed (Step S8, YES), the contents of how to interpolate are determined (Step S9). As a method of making a determination as to whether to perform the interpolation of the viewing line of sight, the viewing-line-of-sight generation/updating unit 5 for example determines to perform the interpolation after calculating the difference of each parameter (the visual point position, viewing direction, viewing angle (angle of field), or focal distance (zoom factor)) of the unchanged and changed viewing lines of sight and then regarding the case where the difference is greater than or equal to a threshold value as a large change of the viewing line of sight. Incidentally, if the changing of the viewing line of sight is only the changing between the viewing lines of sight that are registered in advice, whether the interpolation is performed in advance or not may be determined according to a change pattern of which registered viewing line of sight is changed to which registered viewing line of sight, and the viewing-line-of-sight generation/updating unit 5 may determine to perform the interpolation when a change pattern is the above change pattern. In this case, the viewing-line-of-sight generation/updating unit 5 can determine whether to interpolate just by checking the change pattern without calculating the difference of a parameter of the unchanged and changed viewing lines of sight every time.

When the interpolation of the viewing line of sight is not performed (Step S8, NO) as a result of the determination as to whether to perform the above interpolation (Step S8), the viewing-line-of-sight generation/updating unit 5 simply changes the viewing line of sight (Step S10) and proceeds to a determination process of the drawing method (Step S13).

Then, the viewing-line-of-sight generation/updating unit 5 confirms whether the updating is still preferable or to be stopped in order to make the final viewing line of sight (second virtual line of sight) in accordance with the contents of how to interpolate (Step S11). If the updating is not to be stopped and is still preferable (Step S11, YES), a process of performing the updating of the viewing line of sight by referring to the contents of how to interpolate and changing the viewing line of sight little by little is repeatedly performed (Step S12). If the updating is stopped because the final viewing line of sight is obtained (Step S11, NO), the viewing-line-of-sight generation/updating unit 5 does not update the viewing line of sight and the process proceeds to the subsequent determination process of the drawing method (Step S13).

Incidentally, in the flowchart, for simplicity of explanation, the contents of how to perform the interpolation of the viewing line of sight are determined in advance, and the viewing line of sight is updated by referring to the contents at any time. However, the procedure is not limited to the above. The process of determining the contents of how to perform the interpolation of the viewing line of sight and the process of updating the viewing line of sight may be performed at the same time, and the interpolation calculation of the viewing line of sight may be performed every time the viewing line of sight is updated. Or alternatively, a part of the contents of how to perform the interpolation of the viewing line of sight, which is for example an interpolation method concerning which calculation formula is used in the interpolation of the viewing line of sight, may be determined, and the calculation of the viewing line of sight may be performed in a concrete manner when the viewing line of sight is updated.

The interpolation method of the viewing line of sight of the present embodiment adopts a publicly-known, arbitrary interpolation calculation process in which parameter values of the unchanged and changed change smoothly. For example, the interpolation process in which the value of the visual point position of the viewing line of sight is used as a parameter is determined by the method illustrated in FIGS. 4 to 6.

Figure 4:
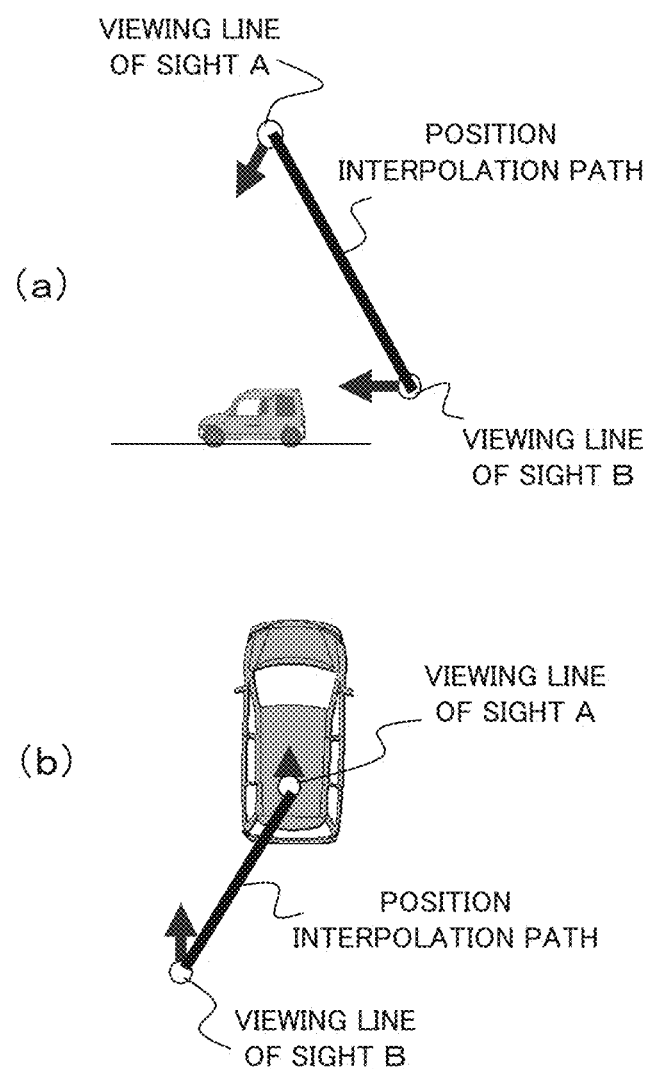
FIG. 4 is a diagram illustrating an example of an interpolation method (linear interpolation) of a parameter of a viewing line of sight according to the embodiment of the present invention.

In FIG. 4, the viewing line of sight A is schematically illustrated as the unchanged viewing line of sight, and the viewing line of sight B as the changed viewing line of sight, when seen from the left side of the driver's vehicle in the case of the cross-sectional view (FIG. 4(a)), and from the sky above the driver's vehicle in the case of the overhead view (FIG. 4(b)). FIG. 4 illustrates an example of performing a simple linear interpolation process of parameters. That is, as a path of the visual point position interpolation of the unchanged viewing line of sight A and the changed viewing line of sight B, a segment AB connecting the visual point position A to the visual point position B is used, and the interpolation is performed in such a way that the line-of-sight position gradually moves and changes on the interpolation path from the viewing line of sight A to the viewing line of sight B. Incidentally, the line-of-sight position may not move and change at constant speed across the interpolation path. The interpolation updating of the line-of-sight position may be performed at arbitrary speed: for example, the moving and changing speed is faster around the viewing line of sight A and the viewing line of sight B and slower in any other places. The speed can be set at any value using the traveling interval and traveling distance on the interpolation path. If an interpolation updating point is updated based on the movement of the line-of-sight position that moves at regular intervals on the interpolation path, the interpolation updating of the position of the viewing line of sight can be performed at constant speed. If the traveling distance is set smaller than others by changing the traveling interval, the interpolation updating of the position of the viewing line of sight can be performed at slower speed in the portion than in other portions.

Figure 5:
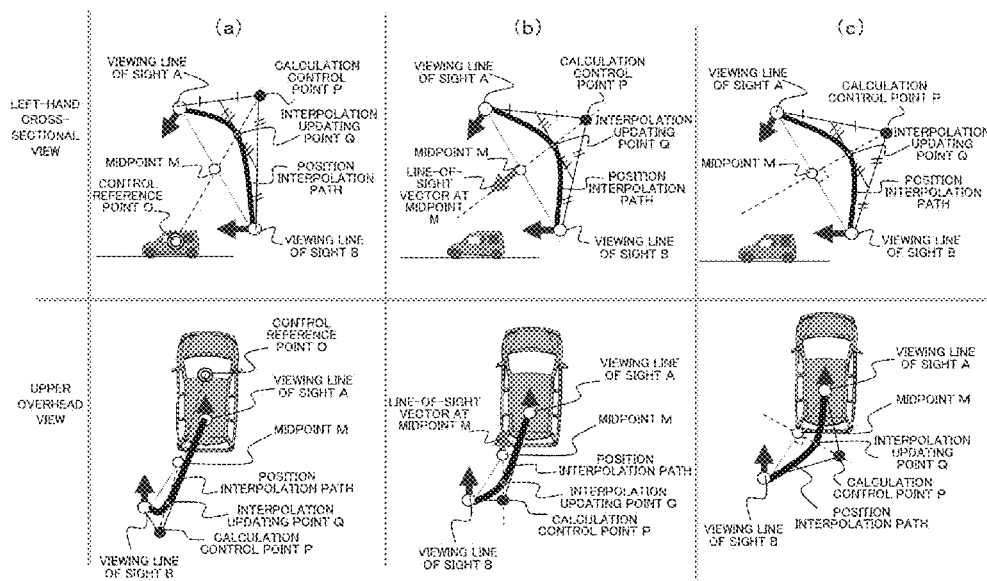
FIG. 5 is a diagram illustrating an example of an interpolation method (B-spline function) of a parameter of a viewing line of sight according to the embodiment of the present invention.

FIG. 5 illustrates an example of an interpolation process that uses an already-know B-spline function to recursively calculate a curve from both two endpoints of the visual point position A of the viewing line of sight A and of the visual point position B of the viewing line of sight B and one control point (calculation control point). One control point defines the shape of a curve as well as how a plane containing the curve is arranged in a three-dimensional space.

With the main focus on variations of the arrangement of the three-dimensional position, the following three patterns are illustrated in FIG. 5 as examples: the case where a segment connecting a control reference point O related to the driver's vehicle to a point (midpoint M) on the segment AB is used (FIG. 5(a)); the case where the point (midpoint M) on the segment AB and a viewing-line-of-sight-direction vector on the point are used (FIG. 5(b)); and the case where the point (midpoint M) on the segment AB, a line perpendicular to the segment AB that passes through the point, and a viewing-line-of-sight-direction vector on A or B are used (FIG. 5(c)). The only difference between the three patterns is the calculation method for the calculation control point P; the same method of performing B-spline interpolation from the calculation control point P, the visual point position A and the visual point position B is used. Thus, the following describes the calculation method of the interpolation position by mainly referring to FIG. 5(a).

In the example of FIG. 5(a), except for the line-of-sight positions (visual point positions A and B) that are endpoints, the viewing-line-of-sight generation/updating unit 5 calculates the calculation control point P needed to calculate a position interpolation path as a point that is away from the midpoint M by a distance that is in a predetermined ratio to the length of the line AB on the line passing through the midpoint M of the segment AB and the control reference point O where the center of gravity of the driver's vehicle is located. As a result, the position interpolation path is on a plane containing three points, A, B and O. According to the B-spline definition, the viewing-line-of-sight generation/updating unit 5 uses A, B and P to calculate the interpolation updating point Q on the midpoint on the segment connecting the midpoints of the segment AP and segment BP. Then, the viewing-line-of-sight generation/updating unit 5 recursively calculates interpolation updating points in the following two directions as interpolation curves: a set in which two endpoints are A and Q and the midpoint of the segment AP is a calculation control point, and a set in which two endpoints are B and Q and the midpoint of the segment BP is a calculation control point. A B-spline curve is calculated as the above process is recursively repeated.

Incidentally, as illustrated in FIG. 5(a), when the control reference point that is based on the driver's vehicle is used for calculating the reference point (calculation reference point) of the interpolation path of the line-of-sight position, it becomes possible to take into account a maximum distance between the curve, which turns out to be the interpolation path, and the driver's vehicle. That is, it becomes possible to specify an interpolation line-of-sight path that turns out to be a line-of-sight position that is most remote from the driver's vehicle. Therefore, it is possible to control the change in the apparent size of the driver's vehicle that occurs due to the change in the positional relationship of the driver's vehicle viewed from the line-of-sight position and line-of-sight position.

The calculation control point P may be calculated by other methods including those illustrated in FIGS. 5(b) and 5(c) instead of the method illustrated in FIG. 5(a). Incidentally, in the case of FIG. 5(b), the control reference point O is not used; a separately-calculated point that is at an arbitrary distance on a line extending the line-of-sight direction vector at the midpoint M on the segment AB is regarded as the calculation control point P. In the case of FIG. 5(c), a point that is at an arbitrary distance on a line that passes through the midpoint M and is perpendicular to the segment AB is regarded as the calculation control point P. According to the method illustrated in FIG. 5(b), the position interpolation path exists on a plane defined by the line-of-sight vectors at points A and B and midpoint M. According to the method illustrated in FIG. 5(c), the position interpolation path exists on a plane defined by vectors calculated from the points A and B and the line-of-sight vectors at points A and B (a mean vector of two vectors and the like, for example).

In this manner, the viewing-line-of-sight direction vector is used for calculating the control point (calculation control point) of the interpolation path of the line-of-sight position. Therefore, it is possible to specify, when the interpolation path is interpolation (curve interpolation) of second or greater order, the direction of deviation of the interpolation line-of-sight position from the linear interpolation in which the path is straight as the distance of the interpolation line of sight with respect to the viewing-line-of-sight direction. That is, in order to specify the distance in the current viewing direction, it becomes easier to grasp the change in the viewing size of a subject that occurs due to the change of the interpolation position, and it becomes easier to imagine the interpolation results.

In FIG. 5, what is illustrated as an example of interpolation of a plurality of orders is the B-spline interpolation in which the number of control points is small. However, such interpolation methods as other groups of curves like Bezier curves and typical N-order interpolation (spline interpolation, Lagrange interpolation, Newton's interpolation and the like) may be applied as long as the interpolation methods pass through the visual point positions A and B. As a group of control points preferable for N-order interpolation, instead of the midpoint M illustrated in FIG. 5 and the calculation control point P on the line passing through the midpoint M, a group of control points calculated from a plurality of points at arbitrary positions on the segment AB may be used. For example, if two control points are preferable, two points A' and B' that are away from both ends of the segment AB by an amount equivalent to 15 percent of the length of the segment AB may be used instead of the midpoint M, and two calculation control points may be calculated from a group of lines passing through the points.

FIG. 6 illustrates an example in which an arc of an ellipse is used as the position interpolation path. In a similar way to that in FIG. 5(c), the viewing-line-of-sight generation/updating unit 5 calculates a plane where the arc of the ellipse exists from the visual point positions A and B and a vector calculated from the line-of-sight vectors of the visual point positions A and B. The viewing-line-of-sight generation/updating unit 5 determines how the arc of the ellipse is disposed with respect to the segment AB connecting the visual point positions with the use of a line that passes through the midpoint M of the segment AB and is perpendicular to the segment AB. That is, the viewing-line-of-sight generation/updating unit 5 sets the ellipse's center C at an arbitrary position on the line that passes through the midpoint M of the segment AB connecting the visual point positions of the viewing line of sight and is perpendicular to the segment AB; calculates the longer and shorter diameters of the ellipse that passes through the visual point positions A and B; and regards the ellipse's arc AB as the position interpolation path. Since the ellipse's arc, which is a part of the ellipse, is regarded as the position interpolation path, it is easier to calculate the interpolation updating position. Instead of the ellipse's arc, the following method may be used to calculate the interpolation path: an interpolation path (an arbitrary trajectory made up of a curve on a plane like the ellipse's arc or a line) for a given segment is determined in advance; the interpolation path is extended according to the actual segment AB; and a plane on which the interpolation path exists is rotated and disposed on a three-dimensional space with the use of the control reference point, midpoint, perpendicular line and viewing direction vector in the same way as that in the example of FIG. 5.

The viewing-line-of-sight generation/updating unit 5 calculates parameters that are in line with the interpolation path calculated in the above way.

In the example illustrated in FIGS. 4 to 6, the interpolation path is depicted as a curve that could be as differentiable as possible so as to match the smooth change of the line of sight. However, the interpolation path is not limited to the above. The viewing-line-of-sight generation/updating unit 5 may calculate a zigzag line that makes a polygon serve as the interpolation path; or a complex path having a combination of one or more lines and one or more curves. In this case, an interpolation path that needs to pass through a specific line of sight, such as the above pseudo driver's line of sight, along the way may be calculated.

FIGS. 4 to 6 illustrate an example of the interpolation process based on the visual point positions. However, a similar interpolation calculation process may be applied to any parameters other than the visual point positions (viewing direction, angle of field, focal distance and the like). The calculation method of the interpolation contents may be different except for whether the interpolation is performed for each parameter: For example, when the interpolation of two parameters, the visual point position and the line-of-sight direction, is performed, the example of FIG. 5(*a*) is used as the interpolation method of the visual point position, while the example of FIG. 4 is used as the interpolation method of the line-of-sight direction.

The interpolation of a parameter having one value, such as the focal distance, may be performed in an arbitrary way. However, in a similar way to the speed of the interpolation description of the visual point positions, the value may be uniformly changed during the interpolation process. The change rate may vary so that the rate of change is slower at the start and end of the interpolation process than in the middle of the interpolation process.

Incidentally, according to the flowchart, the viewing-line-of-sight generation/updating unit 5 calculates the contents of how to perform the interpolation and updating of the viewing line of sight every time. However, if the viewing lines of sight A and B are linked in advance to predetermined scenes, the interpolation paths of the viewing lines of sight can also be determined in advance. Accordingly, a part or all of the interpolation calculation of the parameters of the viewing lines of sight may be performed in advance, and the updating of the viewing lines of sight may be performed by referring to the values.

Figure 7:
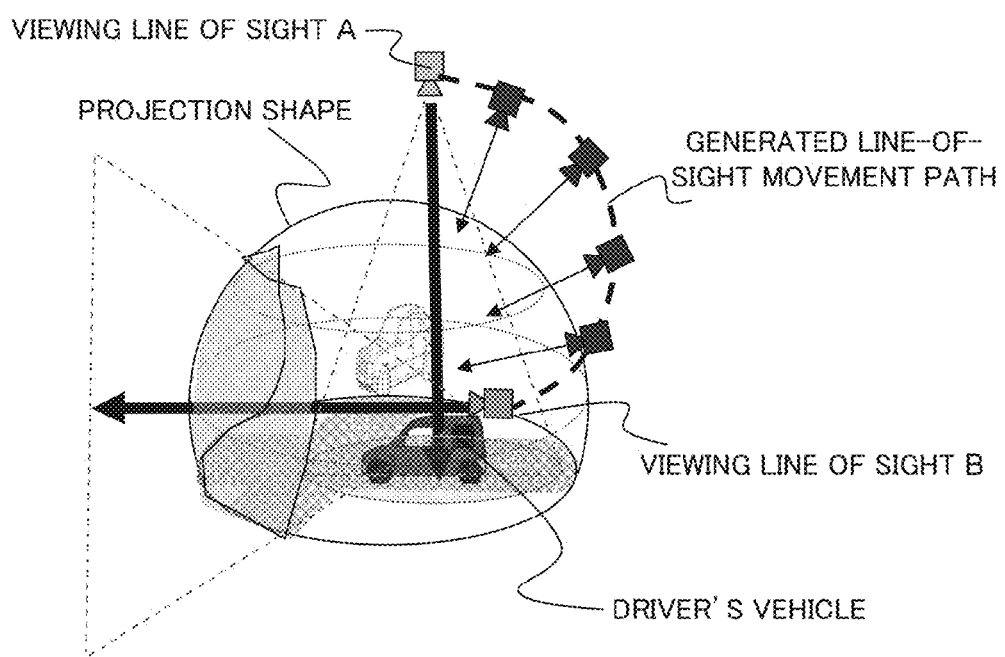
FIG. 7 is a diagram illustrating an example of a line-of-sight movement path from a midair overhead image to a vehicle forward image according to the embodiment of the present invention.

In this manner, the viewing-line-of-sight generation/updating unit 5 calculates the interpolation path of the viewing line of sight and updates the viewing-line-of-sight parameters when preferable so that the viewing-line-of-sight parameters are in line with the path. Therefore, it is possible for the vehicle image processing device 100 to realize a smooth movement of the visual point. For example, as illustrated in FIG. 7, the vehicle image processing device 100 generates a midair overhead image of the driver's vehicle with the viewing line of sight A to mainly view the road surface around the driver's vehicle; generates a vehicle forward image with the viewing line of sight B to mainly view not only the road surface but the general surrounding situation in the forward direction; generates the line-of-sight movement paths corresponding to the viewing lines of sight A and B whose viewing areas and directions are different; and updates the viewing-line-of-sight parameters when preferable so that the viewing-line-of-sight parameters are in line with the path. Therefore, it is possible to generate a changed image in which the area and direction of the viewed image smoothly change as the visual point smoothly moves.

Returning to the explanation of the flowchart of FIG. 2, after the changing and updating of the line of sight, the drawing method determination unit 6 makes a determination as to whether to change the drawing method of the captured image that is a target to be drawn and changes the actual drawing method if the method is to be changed (Steps S13, S14 and S15). Here, for the purpose of convenience, a method of converting some image or shape to another image to be viewed is referred to as a drawing method; a target that is to be converted by the drawing method is referred to as a drawing target. There are two types of drawing method that the drawing method determination unit 6 can determine. One method is to calculate in advance the relationship (referred to as a projection map in this case) between the position of each pixel inside the captured image that is a drawing target and the pixel position inside the drawn image to which the pixel is linked; and allocate the actual pixel color information of the drawing-target image in accordance with the calculated relationship as if a simple task is done. The other method is a similar drawing method to a texture mapping of a typical computer graphics (referred to as CG, hereinafter) for shapes and uses one or more three-dimensional shapes as projection shapes to which the captured image is attached in order to realize a more complex relationship. For the purpose of convenience, the former drawing method is referred to as a drawing method that uses a projection map; the latter drawing method is referred to as a drawing method that uses shape.

As a way of determining a drawing method, the drawing method determination unit 6 makes a determination as to whether there is data for using the drawing method that uses the projection map, i.e. the projection map exists for the viewing line of sight (Step S13). When the data exists (Step S13, YES), the drawing method determination unit 6 uses the drawing method that uses the projection map (Step S14). When the projection map does not exist (Step S13, NO), the drawing method determination unit 6 uses the drawing method that uses projection shape (Step S15).

If the viewing lines of sight are different, the projection map is another data. In order to support various viewing lines of sight, it is desirable that many projection maps be retained. However, in reality, it is impossible given the storage capacity. Accordingly, suppose that the vehicle image processing device 100 of the present embodiment holds projection maps that are calculated in advance for a group of viewing lines of sight corresponding to each usage scene as described in the section of the viewing-line-of-sight changing unit 4. A frequently-used scene is predicted in advance and a projection map is prepared for the corresponding group of viewing lines of sight. Therefore, it is possible to use the efficient drawing method that uses a projection map so that the amount of data, as well as the amount of calculation, is small.

Incidentally, the changing of the viewing line of sight detected by the viewing-line-of-sight changing unit 4 is mainly the changing of the line of sight in any scene other than the one in which the user gives a direct instruction as described above. Therefore, it is highly likely that the unchanged first image made up of the viewing line of sight and the changed second image have a projection map, and that the drawing method that uses the projection map is determined as the drawing method. Meanwhile, in many cases, the changed image (interpolation image) created with the use of the line-of-sight parameter generated by the viewing-line-of-sight generation/updating unit 5 is made of the viewing line of sight generated after the interpolation is performed between scenes or of the viewing line of sight to which fine adjustments are made and does not have a projection map. Therefore, in many cases, the drawing method that uses shape is determined as the drawing method but is less frequently used. Incidentally, the details of the projection map data, the usage of the data, and the contents of the projection shape will be described later.

By the way, if the drawing target is a captured image of a camera other than the vehicle-mounted camera mounted on the driver's vehicle, it is difficult to use the drawing method that uses a projection map. The reason is that the projection map turns out to be another data as the positional relationship between the camera that takes a picture and the viewing line of sight changes. Even if the viewing line of sight does not change as a line of sight that looks down from right above to right below the driver's vehicle, the position of the captured image occupying the drawn viewing image changes as the positional relationship between the image-capturing camera and the driver's vehicle changes because of the movement of the driver's vehicle. Therefore, the projection map, which represents the positional relationship between the pixel position of the captured image and the pixel position of the drawn image, turns out to be another data. Therefore, as illustrated in FIG. 17, when the viewing line of sight is set relative to the driver's vehicle, i.e., when the viewing line of sight automatically moves as the driver's vehicle moves, the driver's vehicle is basically considered to move. Therefore, regardless of whether the viewing line of sight is changed or not, the drawing method that uses shape is used when the drawing target is a captured image of a camera other than the vehicle-mounted camera.

The related object determination unit 7 determines a related object to be used and a drawing method thereof (from step S16 to step S22). The related object is used in viewing the state of the driver's vehicle, the situation around the driver's vehicle and information, such as the traveling direction of the driver's vehicle, the position and size of the obstacle as well as the direction in which the obstacle is located relative to the driver's vehicle, the direction of the destination of the driver's vehicle, the position of the destination, traffic lights around the driver's vehicle, traffic signs such as signs and pavement signs, attention areas such as an intersection where the vehicle is scheduled to turn left or right, congestion/accident-prone areas, recommended shops and other kinds of feature and map information. The information can be acquired from the driving information acquisition unit 1, the road information acquisition unit 2, the direct specification unit 3 or the like. There are two object: an object for representing the existence and contents of information, and an object for representing the information and contents preset by the system mainly as predetermined information, such as the driver's vehicle, the camera mounted on the driver's vehicle and the blind spot of the camera, which are not acquired from the driving information acquisition unit 1, the road information acquisition unit 2, and the direct specification unit 3.

Incidentally, if a captured image of a camera other than the driver's vehicle's is used, a camera that acquires a camera parameter such as position as well as the captured image at once and the camera's blind spot may be regarded as a related object along with the above two.

The related object determination unit 7 confirms whether there is the one that matches a to-be-displayed related object that has been defined in advance, by referring to the input vehicle's state (vehicle information) and doing other processes (Step S16). If the one matches the to-be-displayed related object (Step S16, YES), the one is added to a usage list and it is determined that the one is to be used (Step S17).

The related object determination unit 7 for example confirms that there is to-be-displayed data of the related object of the obstacle for the above position and size of the obstacle input from sensors and the like and the direction in which the obstacle is located relative to the driver's vehicle. Furthermore, based on a preset usage rule such as the following one and the like, the related object determination unit 7 determines whether to use the related object: if the related object is for example located within a traveling predicted lane of the driver's vehicle or for example within 5 m to the left or right of the center line of a traveling predicted lane of the map data whose prediction is based on the position of the driver's vehicle and the traveling direction and the size of the related object is grater than or equal to 10 cm, the related object is to be displayed. Instead of using such a complex determination rule, all related objects may be displayed if there is to-be-displayed data of the related objects.

The related object is made up of the state and contents of the driver's vehicle as well as the state and contents around the driver's vehicle, position data representing the positional relationship about where the related object is located around driver's vehicle, and to-be-displayed data used for drawing. The to-be-displayed data of the related object consists of at least one or more of the following components: a prepared image and a three-dimensional shape. Even when only a character string, which is the contents of information, is to be displayed, font images of characters that make up the character string are regarded as images of the related object for the purpose of convenience. Incidentally, for example, since the driver's vehicle is stuck in traffic congestion, there is information that is exceptionally unclear about the positional relationship from the driver's vehicle and does not have a clear position, such as an estimated time that the driver's vehicle would take to get out of the traffic jam and other kinds of information. However, the vehicle image processing device 100 may supplement, when preferable, the position to be an arbitrary position, which is for example a position specified by the system, before using the position. If the three-dimensional shape is used as display data, information for determining the color of the shape (which for example includes the color of each vertex and a vertex normal line, as well as texture mapping data if preferable) may be retained at the same time along with the shape that is the coordinate value of a vertex inside the three-dimensional space.

According to the present embodiment, in a similar way to the above projection map of the captured image, the following is retained as the display data of the related object: an image of the related object for a group of viewing lines of sight corresponding to each preset usage scene.

Incidentally, the usage list of the related object is reset each time a process comes in the related object determination unit 7, i.e. the drawing process is performed, because the related object is regarded as zero. However, the contents of the usage list used in the previous drawing process may be appropriately changed for reuse. When the usage list is reused, it is preferable to make sure that the retained data, particularly information, of the related object reflects the change of the position data.

According to the present embodiment, in order to make the process simple, the process of determining the drawing method of the next related object is performed after all the to-be-used related objects are examined and added to the usage list. However, the drawing method may be determined each time one to-be-used related object is found. In this case, the usage list could be not preferable if the configuration enables the process to be performed for each related object.

Then, the related object determination unit 7 sequentially checks whether an unprocessed related object is in the usage list (Step S18). When there is an unprocessed related object (Step S18, YES), the related object determination unit 7 determines a drawing method by referring to the to-be-displayed data of the related object (from step S19 to step S22). In this case, the related object determination unit 7 makes a determination as to whether there is the shape of the related object (Step S19). When there is no shape and only an image exists (Step S19, NO), the related object determination unit 7 selects the drawing method that uses an image (Step S22). When there is a shape (Step S19, YES), the related object determination unit 7 makes a determination as to whether to prioritize and select the drawing method that uses shape (Step S20). When the related object determination unit 7 prioritizes and selects the drawing method that uses shape (Step S20, YES), the related object determination unit 7 selects the drawing method that uses shape (Step S21). Incidentally, when the related object determination unit 7 does not prioritize and select the drawing method that uses shape (Step S20, NO), the related object determination unit 7 selects the drawing method that uses an image (Step S22).

Figure 8:
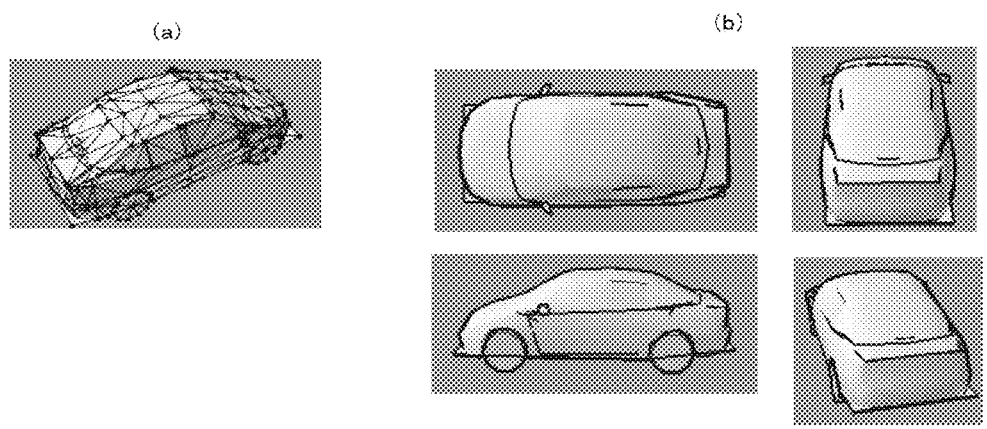
FIG. 8 is a diagram illustrating an example of an image and shape that is display data of a related object (a driver's vehicle) according to the embodiment of the present invention.

FIG. 8 illustrates, as related objects, an example of the image and shape that are display data for representing the position of the driver's vehicle. FIG. 8(a) depicts the three-dimensional shape of the driver's vehicle, which consists of triangular polygons in the example. FIG. 8(b) illustrates images of the driver's vehicle: according to the present embodiment, an image that is seen from above, an image that is seen in the lateral direction, and two images that are diagonally seen are prepared so as to correspond to the viewing lines of sight A to D illustrated in FIG. 17. Incidentally, the number of images is not preferably the same as the number of scenes. The number of images may be an arbitrary value that is equal to or greater than one.

Figure 9:
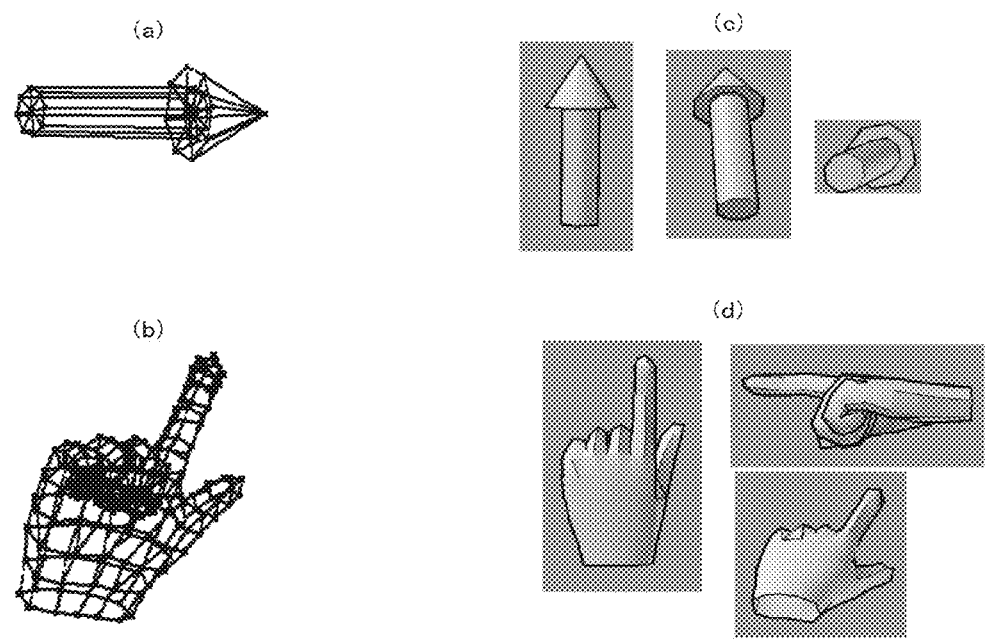
FIG. 9 is a diagram illustrating an example of an image and shape that is display data of a related object (an obstacle and the like) according to the embodiment of the present invention.

FIG. 9 illustrates related objects indicating the existence of obstacles, as an example of the objects for indicating the existence and contents of information acquired from the driving information acquisition unit 1, the road information acquisition unit 2, the direct specification unit 3 and the like. As the related objects indicated by arrows or hands, FIGS. 9(a) and 9(b) depict the three-dimensional shapes, while FIGS. 9(c) and 9(d) depict three types of the image.

The process of determining whether to prioritize and select the drawing method that uses shape is to make a determination as to which drawing method is prioritized and used when both image and shape are retained as data of the related object as illustrated in FIGS. 8 and 9. As for the drawing method that uses shape, the increased cost of drawing is taken into account when the determination is made in large part because the amount of calculation increases. For example, when the determination result of the drawing method of the captured image by the drawing method determination unit 6 leads to the drawing method that uses a projection map, the related object determination unit 7 prioritizes the drawing method that uses an image over shape as the drawing method of the related object. The reason is that the prioritization and determination process is to make sure the following consideration is reflected: the cost of drawing with the use of shape is expensive and, when the shape is not used in the drawing of the captured image, the shape is not used in the drawing of the related object. If the determination result by the drawing method determination unit 6 leads to the drawing method that uses a projection shape, the related object determination unit 7 prioritizes shape as the drawing method of the related object.

As a prioritization/selection determination process other than the above, the related object determination unit 7 may regard the cost of those involving many polygons of the shape of the related object as expensive and use an image. The related object determination unit 7 may examine the current processing load (CPU, memory or data-transferring load) and may use an image when detecting that the load is high. Moreover, the following is also possible: depending on whether the information is of a type that stands out or needs to be emphasized at a time when the information is viewed, such as the driver's vehicle that is frequently enlarged when being displayed or the obstacle that needs to be emphasized, it is determined that the shape is prioritized if there is the shape. The vehicle image processing device 100 determines the drawing method of the related object after going through such a prioritization/selection determination process. However, the prioritization/selection determination process may be omitted.

Incidentally, the drawing method determination unit 6 regards the captured image as a drawing target and determines the drawing method; the related object determination unit 7 regards the related object as a drawing target and determines the drawing method. However, the above way of separation and the processing order are one example. Both may be performed at the same time. The use of the related object and the process of determining the drawing method may be performed in advance.

Returning to the explanation of the flowchart of FIG. 2, the drawing unit 20 performs a drawing process and the display unit 16 performs a display process based on the drawing methods of the captured image and related object determined by the drawing method determination unit 6 and the related object determination unit 7 (Step S23) before the process ends. The drawing process, the display process and the subsequent processes will be described in detail with reference to FIG. 3.

Incidentally, according to the flowchart illustrated in FIG. 2, the drawing is performed even when there is no change in driving information, road information and directly-specified contents (Step S5, NO), i.e. when the surrounding environment of the driver's vehicle and the position of the driver's vehicle do not change, the user does not specify and the viewing visual point does not change (Step S7, NO). However, the process may return to START and not perform the drawing. However, in this case, attention needs to be paid to the following: subtle changes, such as the changes of the external environment of the driver's vehicle that may not probably detected from driving information or road information, which include the swaying of leaves of roadside trees in the wind and the change of the color of a traffic signal, do not appear on a final image and thus may not be viewed when the drawing is not performed, even if the subtle changes have been captured by a camera and retained as a captured image.

With reference to the flowchart of FIG. 3, the drawing process of the drawing unit 20 and the display process of the display unit 16 (the process of step S23 of FIG. 2) will be described.

Based on the drawing methods of the captured image and related objects determined by the drawing method determination unit 6 and the related object determination unit 7, the drawing unit 20 performs the drawing on the basis of the generated line-of-sight parameter when the process has been performed by the viewing-line-of-sight generation/updating unit 5 (from step S117 to step S125). A determination is made as to whether a projection shape is used in the drawing of the captured image (Step S117). If the projection shape is used (Step S117, YES), the projection shape setting unit 10 disposes the projection shape (Step S118). When the projection shape is not used (Step S117, NO), the projection image conversion unit 11 performs the conversion of the captured image using the projection map (Step S119).

Figure 10:
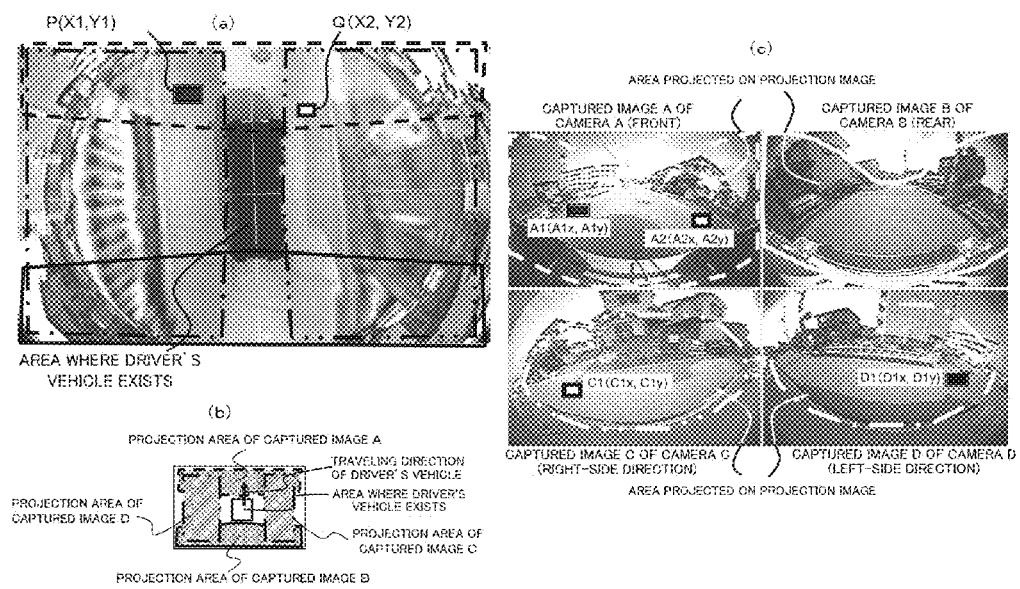
FIG. 10 is a diagram illustrating a sample image for explaining a projection method that uses a projection map according to the embodiment of the present invention.
Figure 12:
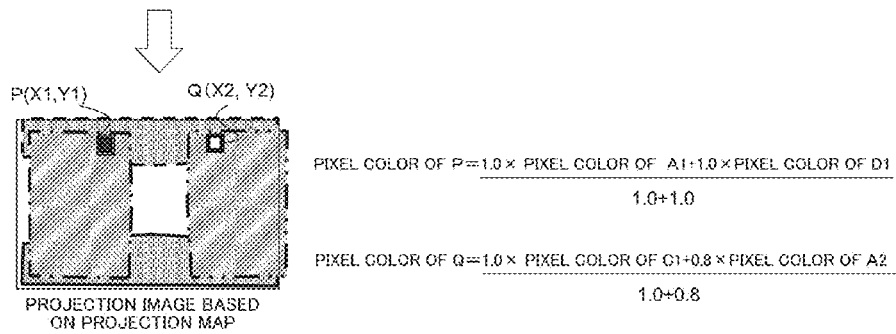
FIG. 12 is a diagram for explaining a projection method that uses a projection map used for all captured images according to the embodiment of the present invention.

Here, the processes of the projection image conversion unit 11 and projection shape setting unit 10 will be described. With reference to FIGS. 10, 11 and 12, the following describes the conversion of the captured image with the use of the projection map by the projection image conversion unit 11.

FIG. 10(a) illustrates an overhead image seen from the sky above the driver's vehicle, as an example of a to-be-viewed projection image created by the projection map's drawing. Incidentally, the upward direction of the image represents the traveling direction of the driver's vehicle. FIG. 10(b) is a schematic diagram of FIG. 10(a) and illustrates, like FIG. 10(a), where a group of captured images of FIG. 10(c) is projected on the projection image. FIG. 10(c) depicts groups of captured images A to D, captured by front, rear, left and right cameras A to D, that are drawing targets. The projection image conversion unit 11 for example generates from each of the captured images illustrated in FIG. 10(c) a projection image as illustrated in FIG. 10(a), which matches the current viewing line of sight, or the viewing line of sight that overlooks from the sky above the driver's vehicle in this case.

Here, in the captured images of FIG. 10(c), a pixel P (X1, Y1) of the projected image of FIG. 10(a) is liked to two, A1 (A1x, A1y) inside the captured image A and D1 (D1x, D1y) inside the captured image D; Q(X2, Y2) is linked to two, A2 (A2x, A2y) inside the captured image A and C1 (C1x, C1y) inside the captured image C. Incidentally, as one example, both P and Q are linked to a plurality of captured images. However, P and Q may be linked to one captured image or three or more captured images.

With reference to FIGS. 11 and 12, an example of a projection map representing the relationship between pixels inside the image illustrated in FIG. 10 will be described. FIG. 11 depicts an example in which even the projection image is generated for each captured image with the use of the projection map for each captured image as a projection map. According to the present embodiment, each projection map is made up of the positions of pixels inside the projection image, the positions of pixels inside the captured image and weighting factors that are used in calculating the color of pixels. The weighting factor represents the priority of each pixel to determine what color is used when the pixels of a plurality of captured images are linked to the same pixel position inside the projection image. However, the weighting factor may be omitted on the assumption that everything has the same priority. In the example illustrated in FIG. 11, the weighting factor is applied to the degree of transparency without change (from 0.0 to 1.0; 1.0 means "obscure," and 0.0 "transparent").

The projection image conversion unit 11 generates a projection image A using a captured image A captured by the camera A and a corresponding projection map A as well as a projection image B using a captured image B captured by the camera B and a corresponding projection map B. The projection image conversion unit 11 similarly generates a projection image C and a projection image D. By combining the above images, the projection image conversion unit 11 generates a projection image (combined projection image). Incidentally, in the projection image generated by the projection image conversion unit 11, a portion that has no corresponding pixels inside the captured image is regarded as a transparent area so that the portion is not taken into account.

Incidentally, in the example where the projection map is described, one pixel is linked to one pixel. However, a pixel area consisting of a plurality of pixels may be liked to a pixel area consisting of a plurality of pixels. Or alternatively, one pixel may be liked to a pixel area. The projection map is not limited to a table illustrated in FIG. 1 as long as it is possible to recognize the relationship between pixels. If there is extra space in the storage capacity, a pixel position data array whose size is the same as the resolution of one of the images may be secured and, only for a portion where there is a pixel of a corresponding image, the position of the pixel of the corresponding image may be written down at the position inside the data array that corresponds to the position of the above pixel. Moreover, the vertical length and lateral length of the image may be normalized and regarded as 1.0; the position inside the image that does not preferably correspond to a strict pixel, like the pixel that is positioned 0.5 from the top and 0.25 from the left, may be specified. In this case, as the color of the pixel corresponding to the specified position, the color of the surrounding pixels may be acquired by an arbitrary existing interpolation method such as a bilinear method.

FIG. 12 illustrates an example in which one projection image is generated from a plurality of captured images with the use of a projection map that is used for all captured images as a projection map. Like the one illustrated in FIG. 11, the projection map for all cameras consists of the positions of pixels inside the projection image, the image IDs of the corresponding captured images, the positions of pixels inside the actual captured image and weighting factors. The relationships inside the projection map are arranged in arbitrary order. The weighting factors carry the same meaning as what is described with reference to FIG. 11; the weighting factors may be similarly omitted. The projection image conversion unit 11 refers to the projection map; merges the colors of pixels while weighting each pixel inside each captured image with a weighting factor; and generates a projection image. For example, as illustrated in FIG. 12, the color of the pixel of C1 is multiplied by a weighting factor of 1.0, the color of the pixel of A2 is multiplied by a weighting factor of 0.8, and then the color of the pixel at point Q is obtained by normalizing the above colors of pixels. In the case of FIG. 12, the linking may be performed with the use of pixel areas as in the case of FIG. 11 and is not limited to what is described on the table.

If a projection area (an area on a captured image that is used in a projection image) corresponding to each line-of-sight parameter and a projection map are set in advance for an interpolation image between the unchanged and changed images (first and second images), it is possible for the projection image conversion unit 11 to carry out the above process.

The following describes a method used by the projection shape setting unit 10 to dispose a projection shape.

The projection shape setting unit 10 sets an arbitrary projection shape in a three-dimensional space relative to the driver's vehicle; and uses a camera parameter of each captured image to set which pixel of what captured image is linked to which position of the projection shape in the same way as an existing texture mapping of computer graphics specifies an attachment position. More specifically, the positional relationship between an image-capturing plane of a camera and the projection shape is calculated from a given projection shape (a predetermined projection shape) disposed relative to the driver's vehicle and camera parameters such as the position of the camera relative to the driver's vehicle and the direction of the camera. Projection calculation is performed to figure out where the camera's image-capturing plane (=the positions of pixels inside the captured image) are to be projected on the projection shape with the use of a typical projection method such as perspective projection in order to calculate how the positions of pixels are linked.

For example, take a line connecting the position of the camera and a point on the image-capturing plane that corresponds to each pixel of the captured image, and calculate a point where the line and the projection shape cross each other. The coordinate of the intersection on the projection shape is liked to the position of a pixel inside the captured image that corresponds to a point on the image-capturing plane. In the example here, the coordinate of the projection shape is calculated from the point on the image-capturing plane (the position of each pixel inside the captured image). However, the following is also possible: a line connecting an arbitrary characteristic point of the projection shape to the position of the camera is calculated and, if the line crosses the image-capturing plane of the camera, the position of a pixel of the captured image that corresponds to a point of the image-capturing plane that the line crosses is liked. In this case, the position of the pixel is the position inside the image that does not preferably correspond to one precise pixel. Moreover, the color of the pixel at the above position of the pixel can be acquired in the same way as what is described with reference to FIG. 11.

Figure 13:
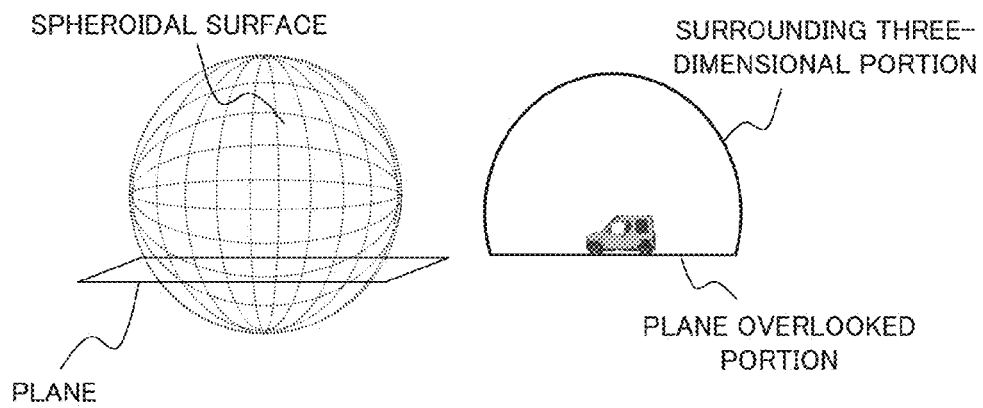
FIG. 13 is a diagram illustrating an example of a projection image consisting of a spheroidal surface and a plane representing a road surface according to the embodiment of the present invention.

FIG. 13 illustrates an example of a projection shape consisting of a spheroidal surface and a plane representing a road surface. A vehicle on the right side of FIG. 13 is the driver's vehicle illustrated for reference to indicate the positional relationship between the vehicle and the projection shape, not a projection shape. In the example here, the projection shape is made up of the spheroidal surface, which is a surrounding three-dimensional portion onto which a surrounding image is mainly projected, and the plane, which is a plane overlooked portion on which the road around the driver's vehicle is mainly projected. However, the projection shape is not limited to this. The projection shape may be an arbitrary plane, an arbitrary curved surface, or a combination of the plane and the surface. The positional relationship between the projection shape and the driver's vehicle may be arbitrarily set.

In this manner, the projection shape setting unit 10 is different from the projection image conversion unit 11: What is calculated by the projection shape setting unit 10 is the liking of the position of pixels that can be calculated only from the relationship between the image-capturing camera and the projection shape regardless of the current viewing line of sight. The linking remains unchanged unless the projection shape changes or the positional relationship between the image-capturing camera and the projection shape changes. Once the linking is calculated, the calculation results may be repeatedly used without performing the calculation again. However, in the case where the projection shape is set relative to the driver's vehicle as illustrated in FIG. 13, i.e. the case where the projection shape automatically moves as the driver's vehicle moves, if a captured image of a camera other than the camera mounted on the driver's vehicle is used, the positional relationship between the image-capturing camera and the projection shape changes as the driver's vehicle moves. Therefore, it is preferable to perform the calculation every time. The liking of the positions of pixels calculated by the projection shape setting unit 10 is used by the projection conversion unit 14 described below, where an image seen along the viewing line of sight is created with the use of information of the viewing line of sight.

Returning to the explanation of FIG. 3, the drawing process of the related object is then performed. The process continues until there is no related object to be displayed. When there is an unprocessed related object (Step S120, YES) and when the drawing method that uses shape is selected at step S21 for the related object (Step S121, YES), the related object shape setting unit 12 sets the shape of the related object in the three-dimensional space relative to the same driver's vehicle as that of the projection shape with the use of positional relationship data of the related object and driver's vehicle (Step S122), and returns to the process of making a determination as to whether there is an unprocessed related object (120 of the flowchart).

Figure 14:
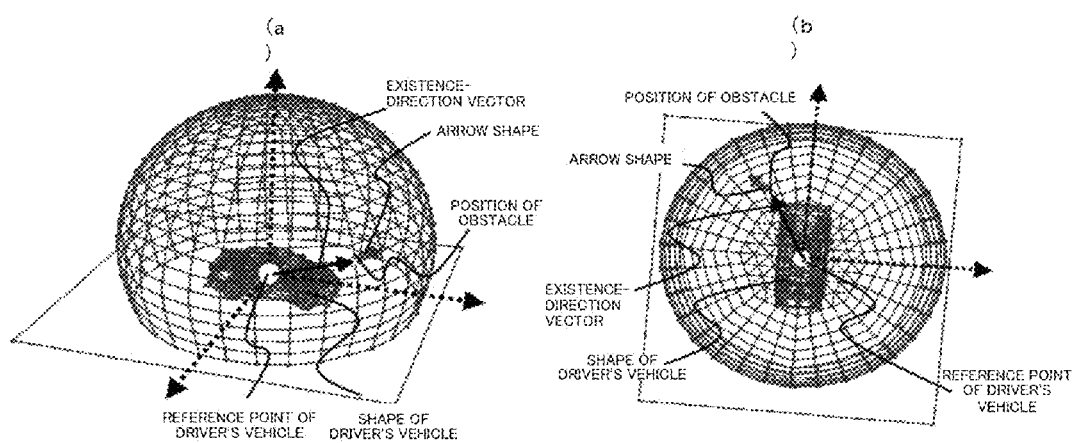
FIG. 14 is a diagram illustrating a model space that is a to-be-processed area of a related object shape setting unit according to the embodiment of the present invention.

The process of the related object shape setting unit 12 will be described with reference to FIG. 14. Incidentally, FIG. 14(a) is a perspective view of a model space that is a to-be-processed area; FIG. 14(b) is a bird's-eye view of the model space.

The following shapes are disposed in the same three-dimensional space: the projection shape consisting of a plane and a spheroidal surface that is centered at the center of the driver's vehicle (the reference point of the driver's vehicle) as illustrated as an example in FIG. 13, the shape of the driver's vehicle, and the shapes of two related objects that are in the shape of an arrow indicating obstacles. For example, the related object shape setting unit 12 uses the actual position of an obstacle obtained from a sensor or the like and disposes an arrow shape as a related object shape around the position of the obstacle in the direction of a vector from the driver's vehicle to the obstacle (existence-direction vector). At this time, if the shape of the related object is disposed outside the projection shape when seen from the driver's vehicle, the related object could not been seen because the related object may be positioned behind the captured image projected onto the projection shape. Therefore fine adjustments may be made so that the related object is disposed inside the projection shape.

Returning to the explanation of FIG. 3, when the drawing method that uses an image (Step S22) is used for the related object instead of the drawing method that uses shape (Step S21, NO), the related object image setting unit 13 selects the image of the related object in accordance with the current viewing line of sight; generates a related object display image where the image is disposed based on the positional relationship between the viewing line of sight and the related object (Step S123); and returns to the process of making a determination as to whether there is an unprocessed related object (step S120).

Figure 15:
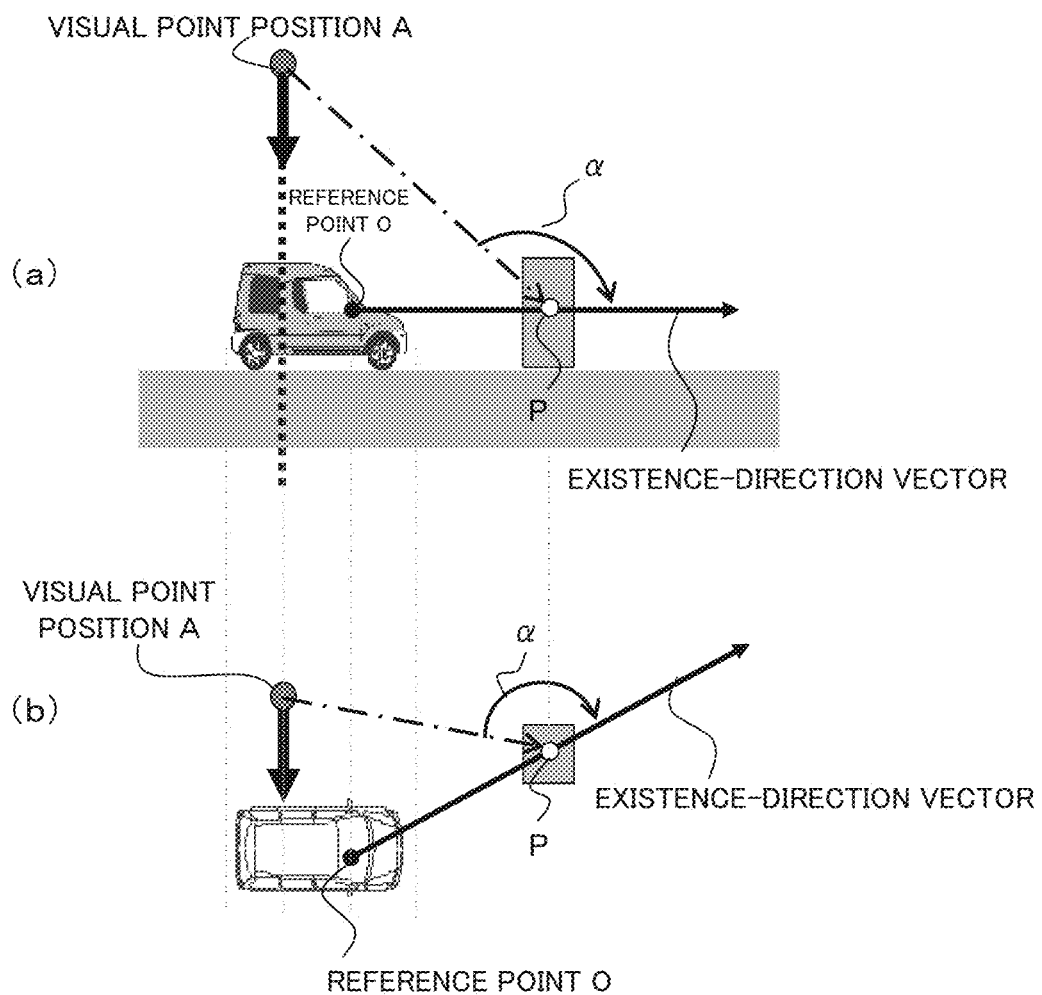
FIG. 15 is a schematic diagram illustrating a driver's vehicle and an obstacle according to the embodiment of the present invention.

FIGS. 15 and 16 illustrate one example of disposing the related object image as well as generating the display image. FIG. 15(a) is a schematic diagram illustrating the driver's vehicle seen from the right direction, the viewing line of sight (referred to as the viewing line of sight A) from the visual point position A, and an obstacle that is an example of the related object (illustrated here as a quadrilateral). FIG. 15(b) is a schematic diagram illustrating the same things as those in FIG. 15(a) but seen from the sky above the driver's vehicle. The viewing line of sight A overlooks the driver's vehicle diagonally from the top left. Suppose the obstacle corresponding to the related object is positioned at P and that a vector extending from the reference point O of the driver's vehicle to the obstacle P is regarded as an existence-direction vector.

FIG. 16(a) depicts the related object images used to display the obstacle. In the example here, an image A is an image viewed from directly above, an image B is an image viewed diagonally from behind, and an image C is an image viewed in a direction that is closer to the backward direction than the image B is viewed. The image data are not just pictures. An image attachment origin D and an image attachment direction vector E are set in advance: an image is to be attached based on the image attachment origin D and the image attachment direction vector E. Incidentally, the image attachment origin D of the image C is positioned slightly above the bottom. In this manner, the positions of the image attachment origins D of the images A, B and C are not all positioned at the centers of the bottom lines of the images, and the positional relationships of the image attachment origins D and image attachment direction vectors E are not the same. However, the positional relationships may be the same.

FIG. 16(b) is an example of a table used in making a determination as to which group of images illustrated in FIG. 16(a) is used.

For example, in FIG. 15, on a plane containing the position P of the obstacle, the visual point position A and the reference point O, suppose that an angle formed by a vector extending from the visual point position A to the obstacle P and a vector extending from the reference point O to the obstacle P, or existence-direction vector, is α: α is an apparent angle of the obstacle viewed from the line-of-sight position A. FIG. 16(b) illustrates a table indicating which image is to be used from three types of images illustrated in FIG. 16(a), depending on the value of the apparent angle α. If the value of α is greater than or equal to 60 degrees and less than 120 degrees, the related object image setting unit 13 uses the image A that is an image viewed from directly above.

Incidentally, according to the present embodiment, the determination is made by the related object image setting unit 13. However, the unit that makes the determination is not limited to the related object image setting unit 13. The determination may be made by the above related object determination unit 7.

FIG. 16(c) illustrates an example of the related object display image made by actually disposing the selected image in accordance with the position where the related object exists. As illustrated in the left portion of FIG. 16(c), the related object image setting unit 13 first calculates, using the line-of-sight parameter of the viewing line of sight A, where the reference point O, the obstacle P and the existence-direction vector are to be projected in the projection image that uses the viewing line of sight A. In this case, in the projection image viewed along the viewing line of sight A that diagonally overlooks from the left rear, the existence-direction vector extends from the driver's vehicle to the top left. The related object image setting unit 13 uses the calculated position of the obstacle P and the existence-direction vector to place the image attachment origin D of FIG. 16(a) at the position P of the obstacle; disposes the image attachment direction vector E in the same direction as the existence-direction vector of the related object; and generates an image illustrated in the right portion of FIG. 16(c) that is a related object display image. Incidentally, the related object image setting unit 13 makes the color of a portion where the related object image is not disposed transparent in the related object display image as illustrated in the right portion of FIG. 16(c).

Incidentally, in the example here, for simplicity of explanation, the related object display image having a large transparent portion is created in the same size as the projection image for each related object. However, the related object display image and the projection image are not preferably the same in size. In order to reduce the storage capacity, the following is possible: the related object display image is made as a smaller image with a reduced transparent portion, the position where the related object display image is to be disposed relative to the projection image and the like are determined, and the related object display image is superimposed by the image superimposing unit 15 described later by referring to the disposition position and the like. The related object display image may not be generated. The color of the related object image may be directly written to the following image by the image superimposing unit 15 described later by referring to the disposition of the related object determined: the final viewing image or an arbitrary image that is used as a material to make the final viewing image through superimposing, blending and other processes, such as another related object display image or a projection image corresponding to a captured image of a given camera.

After the processes are performed by the related object shape setting unit 12 and the related object image setting unit 13, whether there is an unprocessed related object is checked again. If there is no unprocessed related object (Step S120, NO), the projection conversion unit 14 performs the following process when the projection shape is used in the drawing method of the captured image (Step S117, YES) or/and when the shape is used in the drawing method of the related object (Step S121, YES): the process of making a projection conversion image reflect the actual color of pixels of the captured image with the use of the relationship with the captured image preset in the projection shape, converting the captured image and the related object shape that is set at the same time into an image seen along the current viewing line of sight with the use of an already known projection method such as perspective projection, and generating the projection conversion image (Step S124).

For example, the projection conversion unit 14 makes a determination as to whether a line passing through the visual point of the current viewing line of sight and a point inside a pseudo image-capturing plane of the viewing line of sight crosses the projection shape and the related object shape; acquires the color at the intersection of the shape that the line crosses; calculates the color of the pixel position of the projection conversion image corresponding to the image-capturing plane; and draws the pixel using the color to obtain the projection conversion image. The calculation method is a calculation method that uses perspective projection, one example of the already-known projection method, which is also used by the projection shape setting unit 10 in calculating the relationship of the pixel positions. Projection conversion is therefore realized by the projection conversion unit 14. If the shape that the line crosses is a projection shape, the color at the intersection can be obtained from the color of the pixel of the captured image that is obtained by referring to the relationship with the present captured image. Incidentally, as the color at the intersection, the color of the related object or the color of the intersection that is the color of the pixel of the corresponding captured image may be used without change. Or alternatively, with the use of a typical CG shading method (drawing color calculation method), a more realistic color may be calculated from the reflectivity of a light source or shape that is set for the scene, a surface normal line of the intersection, or the like for use.

If it is found as a result of the intersection determination that the line does not cross the projection shape or related object shape, the color of the pixel of the corresponding projection conversion image may be made transparent or any arbitrary color such as a default background color. If the projection conversion unit 14 uses only the related object shape without using the projection shape, i.e. if a projection image conversion unit 17 performs the process for the captured image using the drawing method that uses the projection map while the related object shape setting unit 12 and the projection conversion unit 14 perform the processes for the related object using the drawing method that uses shape, it is especially desirable that the color of the pixel be transparent. Since a portion other than the portion where the related object is projected is made transparent in the projection conversion image, the color of the lower image can be seen through the portion other than the related object after another image is superimposed by the image superimposing unit 15 described below. As a result, the projection conversion image whose drawing target is the captured image generated by the projection image conversion unit 11 can be superimposed below the projection conversion image so as to be beautifully visible therethrough; and an image where the related object appears to be written on the converted captured image can be created.

In that manner, the projection conversion unit 14 performs the projection conversion calculation using the viewing line of sight changed by the viewing-line-of-sight changing unit 4 and the parameter of the viewing line of sight that is interpolated and updated by the viewing-line-of-sight generation/updating unit 5, thereby making the projection conversion image of the captured image and related object viewed along the above viewing lines of sight.

Meanwhile, when the projection shape is not used in the drawing method of the captured image (Step S117, NO) and when there is no related object or the shape is not used in the drawing method of the related object (Step S121, NO), the projection conversion process by the projection conversion unit 14 (Step S124) is skipped.

Then, the image superimposing unit 15 superimposes one or more projection conversion images generated by the projection image conversion unit 11 or projection conversion unit 14 as well as a related object display image if there is a related object drawn by the image and outputs a final output image (Step S125). The display unit 16 displays the finally output image generated by the image superimposing unit 15 (Step S126). The process of the vehicle image processing device 100 then ends.

As described above, according to the present embodiment, the projection map is used in an effective manner for the viewing lines of sight that changes according to scenes. Therefore, it is possible to smoothly change the line of sight with less processing load. For the related object to be displayed at the same time, the shape and image of the related object are selected for use. Therefore, the displaying can be realized without any sense of discomfort for the smooth changing of the line of sight with less processing load.

Moreover, the vehicle image processing device 100 of the present embodiment can realize the smooth changing of a viewing line of sight that may not determined in advance, which is for example the changing to a viewing line of sight that is dynamically calculated, such as a line of sight that gets closer to an obstacle in such a way that the obstacle is closely observed. At the same time, the vehicle image processing device 100 continuously makes a determination as to whether it is preferable to perform the three-dimensional model calculation by monitoring a change of the line of sight. Therefore, the power of the calculation process can be saved.

Incidentally, an image acquisition means corresponds to the group of cameras 8 and distortion correction unit 9 of the present embodiment. A projection conversion means corresponds to the drawing unit 20 (the projection shape setting unit 10 and the projection conversion unit 14) of the present embodiment. A line-of-sight change detection means corresponds to the viewing-line-of-sight changing unit 4 of the present embodiment. A line-of-sight parameter generation means corresponds to the viewing-line-of-sight generation/updating unit 5 of the present embodiment.

A changed image generation means corresponds to the drawing unit 20 (the projection shape setting unit 10 and the projection conversion unit 14) of the present embodiment. An image conversion means corresponds to the drawing unit 20 (the projection image conversion unit 11). A related object determination means corresponds to the related object determination unit 7 of the present embodiment. A related object data selection means corresponds to the related object determination unit 7.

A related object image setting means corresponds to the related object image setting unit 13 of the present embodiment. A related object shape setting means corresponds to the related object shape setting unit 12. A vehicle information acquisition means corresponds to the driving information acquisition unit 1 and road information acquisition unit 2 of the present embodiment.

The smooth changing of the virtual line of sight is realized. The changed image that gradually changes before and after change is generated. Therefore, it is possible for a user to easily grasp the situation around the vehicle displayed on an image after the virtual line of sight changes.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A vehicle image processing apparatus comprising:
   a memory configured to store a captured image which is an image that has captured an area around a vehicle with use of at least one camera; and
   a processor coupled to the memory, the processor configured to:
   acquire the captured image;
   convert, using at least one predetermined projection shape, the captured image into an image viewed along a virtual line of sight that is a line of sight running from a predetermined position in a predetermined direction;
   detect whether a virtual line of sight is switched from a position of a first virtual line of sight to a position of a second virtual line of sight which is a different virtual line of sight, the position of the first virtual line of sight associated with a parameter value of at least one selected from a predetermined position and a direction of the virtual line of sight and the position of the second virtual line of sight being associated with a parameter value different from the parameter value associated with the position of the first virtual line of sight;
   acquire at least one type of parameter value associated with a virtual line of sight for each position of the first virtual line of sight and the second virtual line of sight after detecting that the virtual line of sight is switched from the position of the first virtual line of sight to the position of the second virtual line of sight, and generate a parameter value of a position of a virtual line of sight that is gradually changed along a predetermined path connecting the position of the first virtual line of sight and the position of the second virtual line of sight;
   convert the captured image to an image viewed along at least one virtual line of sight among the first virtual line of sight and the second virtual line of sight using a projection map which includes a relationship between a position of a pixel of the captured image and a position of a pixel of an image viewed along the first virtual line of sight or the second virtual line of sight, and generate the converted image to be viewed from the virtual line of sight included in the virtual line of sight group changing from the first virtual line of sight to the second virtual line of sight not using a projection map but using a predetermined projection shape with the linking of the position of pixels calculated by the positional relationship between the image-capturing camera and the projection shape, the linking indicating a relationship between positions on the projection shape and pixels in the captured image; and detect that the position of the first virtual line of sight is switched to the position of the second virtual line of sight when a switching occurs of a pre-registered virtual line of sight or when a difference between unchanged and changed virtual lines of sight is greater than or equal to a specified value.

2. The vehicle image processing apparatus according to claim 1, wherein the processor is configured to change the drawing part of the predetermined projection shape in the converted image based on the generated parameter value so that the converted image is a part of the converted image group which is gradually changed from a first image viewed along the position of the first virtual line of sight to a second image viewed along the position of the second virtual line of sight.

3. The vehicle image processing apparatus according to claim 1, wherein
when the captured image is converted to the image viewed along at least one virtual line of sight among the first virtual line of sight and the second virtual line of sight, the conversion of the captured image is performed without using a predetermined projection shape, and
the virtual line of sight group does not include at least one selected from the first virtual line of sight and the second virtual line of sight.

4. A vehicle image processing method comprising:
acquiring a captured image which is an image that has captured an area around a vehicle with use of at least one camera;
using at least one predetermined projection shape to convert the captured image into an image viewed along a virtual line of sight that is a line of sight running from a predetermined position in a predetermined direction;
detecting whether a virtual line of sight is switched from a position of a first virtual line of sight to a position of a second virtual line of sight which is a different virtual line of sight, the position of the first virtual line of sight associated with a parameter value of at least one selected from a predetermined position and a direction of the virtual line of sight and the position of the second virtual line of sight being associated with a parameter value different from the parameter value associated with the position of the first virtual line of sight;

acquiring at least one type of parameter value associated with a virtual line of sight for each position of the first virtual line of sight and the second virtual line of sight after detecting that the virtual line of sight is switched from the position of the first virtual line of sight to the position of the second virtual line of sight, and generating a parameter value of a position of a virtual line of sight that is gradually changed along a predetermined path connecting the position of the first virtual line of sight and the position of the second virtual line of sight;
converting the captured image to an image viewed along at least one virtual line of sight among the first virtual line of sight and the second virtual line of sight using a projection map which includes a relationship between a position of a pixel of the captured image and a position of a pixel of an image viewed along the first virtual line of sight or the second virtual line of sight, and generating the converted image to be viewed from the virtual line of sight included in the virtual line of sight group changing from the first virtual line of sight to the second virtual line of sight not using a projection map but using a predetermined projection shape with the linking of the position of pixels calculated by the positional relationship between the image-capturing camera and the projection shape, the linking indicating a relationship between positions on the projection shape and pixels in the captured image; and
detecting that the position of the first virtual line of sight is switched to the position of the second virtual line of sight when a switching occurs of a pre-registered virtual line of sight or when a difference between unchanged and changed virtual lines of sight is greater than or equal to a specified value.

5. The vehicle image processing method according to claim 4, further comprising changing the drawing part of the predetermined projection shape in the converted image based on the generated parameter value so that the converted image is a part of the converted image group which is gradually changed from a first image viewed along the position of the first virtual line of sight to a second image viewed along the position of the second virtual line of sight.

6. The vehicle image processing method according to claim 4, wherein
when converting the captured image to the image viewed along at least one virtual line of sight among the first virtual line of sight and the second virtual line of sight, the conversion of the captured image is performed without using a predetermined projection shape, and
the virtual line of sight group does not include at least one selected from the first virtual line of sight and the second virtual line of sight.

\* \* \* \* \*